US011988393B2

(12) United States Patent
Mou et al.

(10) Patent No.: US 11,988,393 B2
(45) **Date of Patent: *May 21, 2024**

(54) RANGE HOOD FOR PREVENTING AIR POLLUTION

(71) Applicant: Microjet Technology Co., Ltd., Hsinchu (TW)

(72) Inventors: Hao-Jan Mou, Hsinchu (TW); Yung-Lung Han, Hsinchu (TW); Chi-Feng Huang, Hsinchu (TW); Chin-Chuan Wu, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 81 days.

This patent is subject to a terminal disclaimer.

(21) Appl. No.: 17/828,687

(22) Filed: May 31, 2022

(65) Prior Publication Data

US 2023/0235892 A1 Jul. 27, 2023

(30) Foreign Application Priority Data

Jan. 24, 2022 (TW) ................................. 111102960

(51) Int. Cl.
*F24C 15/20* (2006.01)

(52) U.S. Cl.
CPC .......... *F24C 15/20* (2013.01); *F24C 15/2035* (2013.01); *F24C 15/2042* (2013.01)

(58) Field of Classification Search
None
See application file for complete search history.

(56) References Cited

U.S. PATENT DOCUMENTS

| | | | | |
|---|---|---|---|---|
| 2002/0179084 A1* | 12/2002 | Swierczyna | F24C 15/2035 | 126/299 R |
| 2011/0086118 A1* | 4/2011 | Kim | B01D 53/34 | 424/769 |
| 2019/0015780 A1* | 1/2019 | Lv | B01D 53/86 | |
| 2019/0035249 A1* | 1/2019 | Mou | F24F 11/52 | |
| 2019/0039009 A1* | 2/2019 | Jun | F24F 13/28 | |
| 2019/0128535 A1* | 5/2019 | Chien | F24C 15/20 | |
| 2022/0282873 A1* | 9/2022 | Frayer | B01D 46/46 | |

FOREIGN PATENT DOCUMENTS

| | | |
|---|---|---|
| CN | 204704956 U | 10/2015 |
| CN | 207849488 U | 9/2018 |
| CN | 108105827 B | 5/2021 |
| TW | M455831 U1 | 6/2013 |
| TW | I607190 B | 12/2017 |
| TW | 202124025 A | 7/2021 |

* cited by examiner

*Primary Examiner* — Ko-Wei Lin
(74) *Attorney, Agent, or Firm* — Birch, Stewart, Kolasch & Birch, LLP

(57) ABSTRACT

A range hood for preventing air pollution is disclosed and includes a main body, a gas guider, a filtration and purification component and at least one gas detection module. The main body is configured to form a diversion path. The gas guider is disposed in the diversion path for guiding an air convection. The filtration and purification component is disposed in the diversion path for filtering and purifying an air pollution source contained in the air convection guided by the gas guider. The at least one gas detection module is disposed in the diversion path for detecting the air pollution source and transmitting a gas detection datum.

18 Claims, 20 Drawing Sheets

42

RANGE HOOD FOR PREVENTING AIR POLLUTION

FIELD OF THE INVENTION

The present disclosure relates to a range hood for filtering and detecting air pollution, and more particularly to a range hood for preventing air pollution.

BACKGROUND OF THE INVENTION

In recent years, people pay more and more attention to the air quality around our daily lives. Particulate matter (PM), such as $PM_1$, $PM_{2.5}$ and $PM_{10}$, carbon monoxide, carbon dioxide, total volatile organic compounds (TVOC), formaldehyde and even suspended particles, aerosols, bacteria and viruses contained in the air and exposed in the environment might affect the human health, and even endanger people's life seriously.

However, it is not easy to control the indoor air quality. Except for the air quality of the outdoor space, the air environmental conditions and pollution sources, especially the dusts, bacteria and viruses in the indoor space originated from poor air circulation in the indoor space, in the indoor space are also the major factors that affect indoor air quality.

Therefore, it is a main subject developed in the present disclosure to provide a solution of purifying the indoor air quality to reduce the risks of breathing hazardous gases in the indoor space and monitoring the indoor air quality in real time, anytime and anywhere, so as to purify the air in the indoor space and improve the indoor air quality as soon as possible.

SUMMARY OF THE INVENTION

One object of the present disclosure is to provide a range hood for preventing air pollution, which can detect the indoor air quality through a gas detection module, so as to realize the status of the air quality in the surrounding environment in real time. Moreover, a gas guider is utilized to conduct the air pollution source, so that the air pollution can be filtered in real time through the filtration and purification component. A microcontroller is further utilized to receive datum detected by the gas detection module so as to control the enablement of the gas guider and adjust a guiding air-flow volume, so that the air quality in the environment can be detected and the air pollution source can be filtered and handled in real time.

In accordance with an aspect of the present disclosure, a range hood for preventing air pollution is provided and includes a main body, a gas guider, a filtration and purification component and at least one gas detection module. The main body is configured to form a diversion path. The gas guider is disposed in the diversion path for guiding an air convection. The filtration and purification component is disposed in the diversion path for filtering and purifying an air pollution source contained in the air convection guided by the gas guider. The at least one gas detection module is disposed in the diversion path for detecting the air pollution source and transmitting a gas detection datum.

In accordance with another aspect of the present disclosure, a range hood for preventing air pollution is provided and includes a main body, a gas guider, a filtration and purification component, at least one gas detection module and a microcontroller. The main body is configured to form a diversion path. The gas guider is disposed in the diversion path for guiding an air convection. The filtration and purification component is disposed in the diversion path for filtering and purifying an air pollution source contained in the air convection guided by the gas guider. The at least one gas detection module is disposed in the diversion path for detecting the air pollution source and transmitting a gas detection datum. The microcontroller receives the gas detection datum of the gas detection module through a wired or wireless communication transmission, and intelligently compares the gas detection datum under a surveillance status, so as to issue a driving instruction for controlling an enablement of the gas guider and adjusting a guiding air-flow volume.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
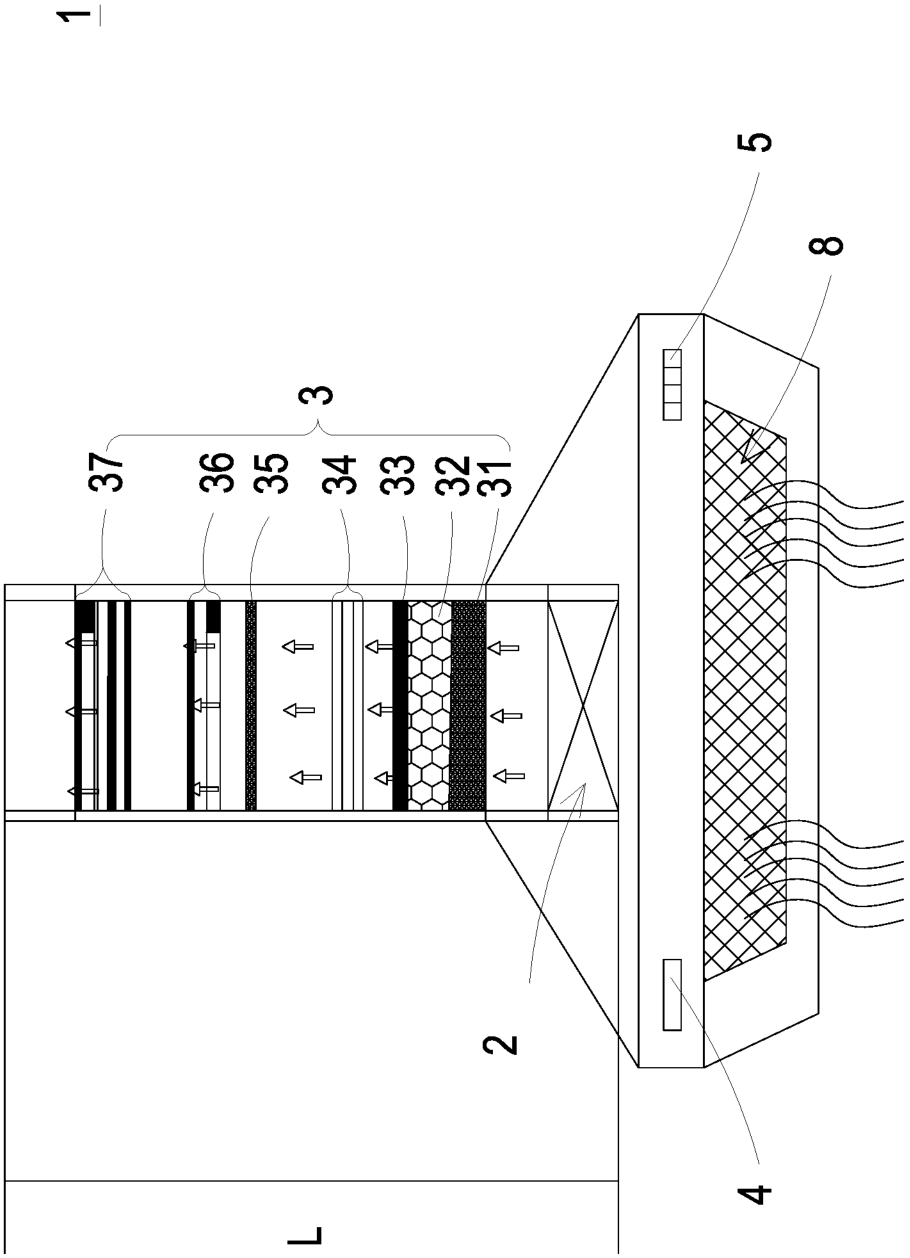
FIG. 1A is a schematic exterior view illustrating a range hood for preventing air pollution according to an embodiment of the present disclosure.
Figure 1B:
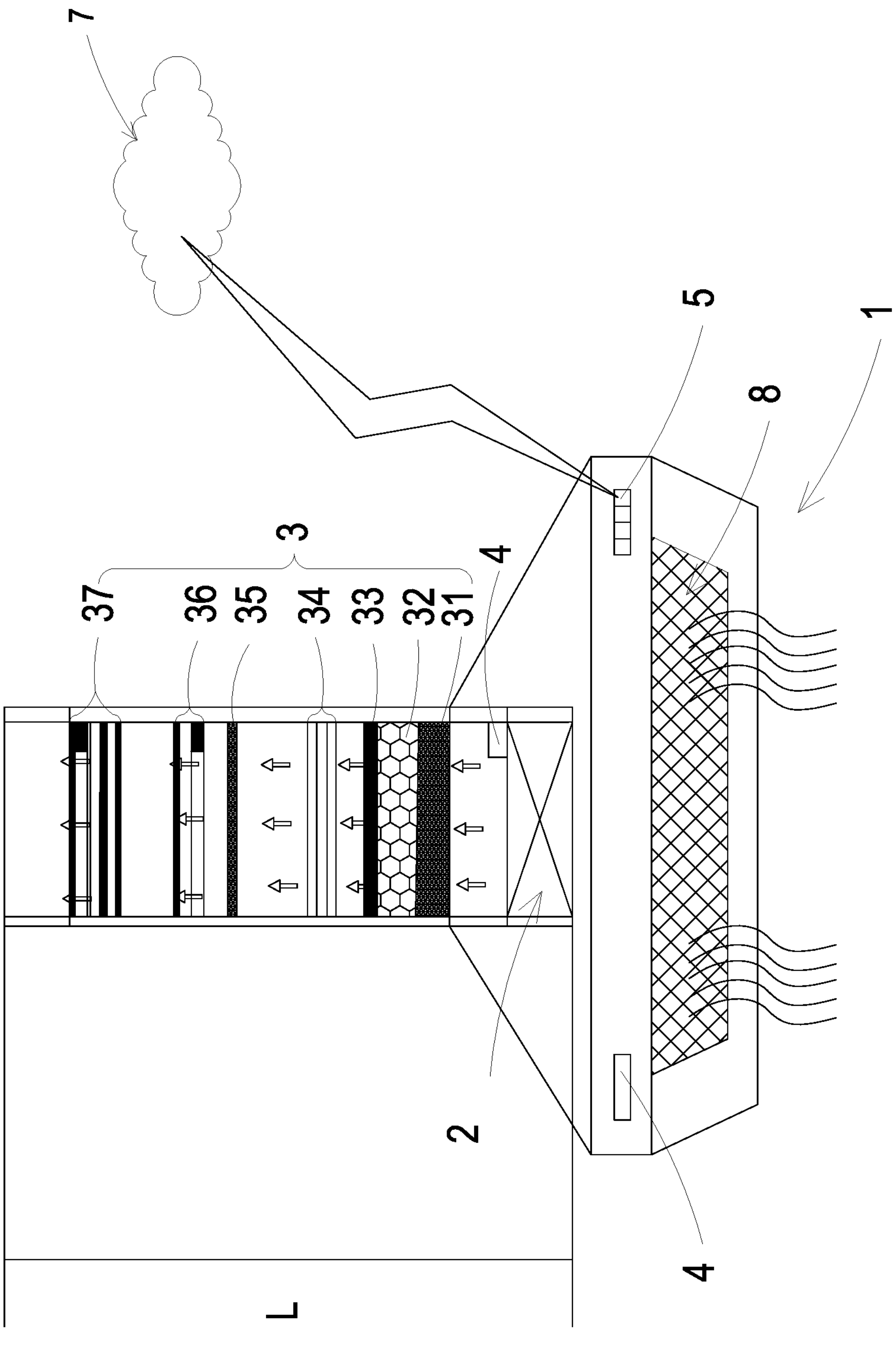
FIG. 1B is a schematic view illustrating the range hood for preventing air pollution connected with a cloud computing system according to the embodiment of the present disclosure.

Please refer to FIGS. 1A and 1B. The present disclosure provides a range hood for preventing air pollution including a main body 1, a gas guider 2, a filtration and purification component 3, at least one gas detection module 4 and a microcontroller 5. The main body 1 is configured to form a diversion path L. The gas guider 2 is disposed in the diversion path L for guiding an air convection. The filtration and purification component 3 is disposed in the diversion path L for filtering and purifying an air pollution source contained in the air convection guided by the gas guider 2. The at least one gas detection module 4 is disposed in the diversion path L for detecting the air pollution source and transmitting a gas detection datum. The microcontroller 5 receives the gas detection datum of the gas detection module 4 through a wireless communication transmission, and intelligently compares the gas detection datum under a surveillance status, so as to issue a driving instruction for controlling an enablement of the gas guider 2 and adjusting a guiding air-flow volume. The surveillance status is activated as the gas detection datum of the air pollution source detected by the gas detection module 4 exceeds a safety detection value. In an embodiment, the range hood further includes an oil separator 8 disposed in the diversion path L. Preferably but not exclusively, the oil separator 8 is placed in front of the filtration and purification component 3, so that the oil contained in the air pollution source can be separated first after the air pollution source is guided into the diversion path L by the gas guider 2.

Preferably but not exclusively, the gas guider 2 is a centrifugal fan, but not limited thereto. Any gas guider 2 capable of generating airflow and fluid flow can be an extension example of this embodiment of the present disclosure. Notably, the filtration and purification component 3 can be arranged before or after the gas detection module 4. Preferably but not exclusively, in the embodiment shown in FIG. 1A, when the airflow is introduced into the main body 1 by the gas guider 2, the gas is detected by the gas detection module 4 first, and then flows through the filtration and purification component 3. In alternative embodiment, when the airflow is introduced into the main body 1 by the gas guider 2, the gas flows through the filtration and purification component 3 first, and then is detected by the gas detection module 4. Both of these embodiments fall within the scope of the present disclosure. Notably, in the embodiment, after the microcontroller 5 receives the gas detection datum detected by the gas detection module 4 through a wireless communication transmission, the microcontroller 5 performs an intelligent judgment and issues a driving instruction to control the enablement of the gas guider 2 or adjusting the value of the guiding air-flow volume. Therefore, the increment of the guiding air-flow volume of the gas guider 2 is greatly increased as the gas detection datum is much larger than the safety detection value, and the increment of the guiding air-flow volume of the gas guider 2 is decreased when the gas detection datum is closer to the safety detection value. Preferably but not exclusively, the clean air delivery rate (CADR) of the range hood is greater than 20 $m^3/h$, so as to achieve the object of purifying the indoor air quality rapidly.

Please refer to FIG. 3 to FIG. 9A. In the embodiment, the gas detection module 4 includes a controlling circuit board 41, a gas detection main part 42, a microprocessor 43 and a communicator 44. The gas detection main part 42, the microprocessor 43 and the communicator 44 are integrally packaged on the controlling circuit board 41 and electrically connected to each other. The microprocessor 43 controls the driving signal of the gas detection main part 42 to enable the detection. The gas detection main part 42 detects the air pollution source and outputs a detection signal. The microprocessor 43 receives the detection signal for calculating, processing and outputting, so that the microprocessor 43 of the gas detection module 4 generates the gas detection datum, which is provided to the communicator 44 for external communication transmission. The above-mentioned external communication transmission of the communicator 44 can be a wired two-way communication transmission or a wireless two-way communication transmission. Preferably but not exclusively, the wired two-way communication transmission is one selected form the group consisting of a USB communication transmission, a mini-USB communication transmission and a micro-USB communication transmission. Preferably but not exclusively, the wireless two-way communication transmission is one selected from the group consisting of a Wi-Fi communication transmission, a Bluetooth communication transmission, a radio frequency identification communication transmission and a near field communication (NFC) transmission. Preferably but not exclusively, the microcontroller 5 receives the gas detection datum transmitted by the communicator 44 through a wireless communication transmission.

Please refer to FIG. 4C, FIG. 5A, FIG. 5B, FIG. 6, FIG. 7A and FIG. 7B. In the embodiment, the gas detection main part 42 includes a base 421, a piezoelectric actuator 422, a driving circuit board 423, a laser component 424, a particulate sensor 425, an outer cover 426 and a gas sensor 427. In the embodiment, the base 421 includes a first surface 4211, a second surface 4212, a laser loading region 4213, a gas-inlet groove 4214, a gas-guiding-component loading region 4215 and a gas-outlet groove 4216. The first surface 4211 and the second surface 4212 are two surfaces opposite to each other. In the embodiment, the laser loading region 4213 is hollowed out from the first surface 4211 toward the second surface 4212, so as to accommodate the laser component 424. The outer cover 426 covers the base 421 and includes a side plate 4261. The side plate 4261 has an inlet opening 4261*a* and an outlet opening 4261*b*. The gas-inlet groove 4214 is concavely formed from the second surface 4212 and disposed adjacent to the laser loading region 4213. The gas-inlet groove 4214 includes a gas-inlet 4214*a* and two lateral walls. The gas-inlet 4214*a* is in communication with an environment outside the base 421, and is spatially corresponding in position to an inlet opening 4261*a* of the outer cover 426. Two transparent windows 4214*b* are opened on the two lateral walls of the gas-inlet groove 4214 and are in communication with the laser loading region 4213. Therefore, the first surface 4211 of the base 421 is covered and attached by the outer cover 426, and the second surface 4212 is covered and attached by the driving circuit board 423, so that an inlet path is defined by the gas-inlet groove 4214.

Figure 6:
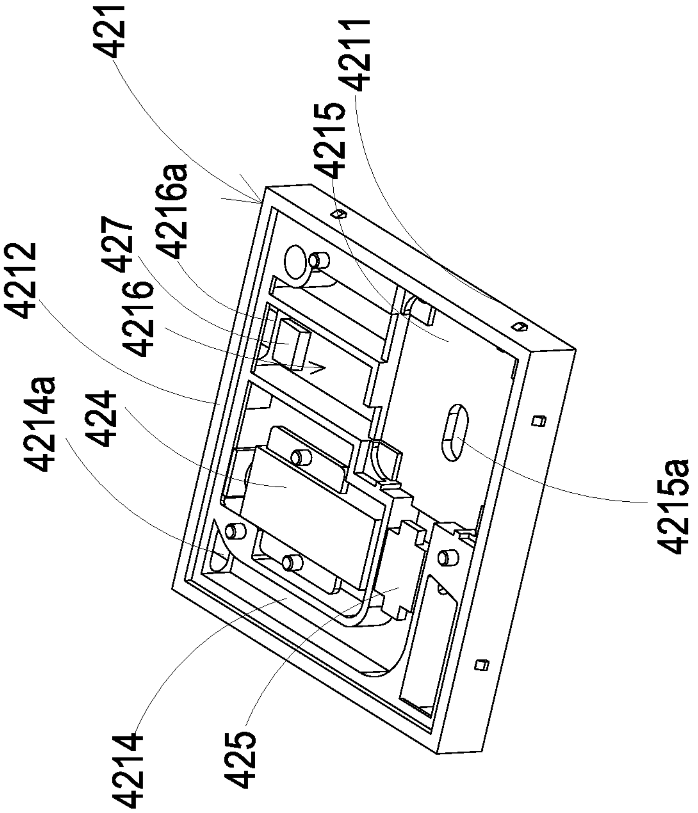
FIG. 6 is a schematic view illustrating the base of the gas detection main part of the gas detection module in combination with the laser component according to the embodiment of the present disclosure.

Please refer to FIG. 6. In the embodiment, the gas-guiding-component loading region 4215 mentioned above is concavely formed from the second surface 4212 and in communication with the gas-inlet groove 4214. A ventilation hole 4215*a* penetrates a bottom surface of the gas-guiding-component loading region 4215. The gas-guiding-component loading region 4215 includes four positioning protrusions 4215*b* disposed at four corners of the gas-guiding-component loading region 4215, respectively. In the embodiment, the gas-outlet groove 4216 includes a gas-outlet 4216*a*, and the gas-outlet 4216*a* is spatially corresponding to the outlet opening 4261*b* of the outer cover 426. The gas-outlet groove 4216 includes a first section 4216*b* and a second section 4216*c*. The first section 4216*b* is concavely formed out from the first surface 4211 in a region spatially corresponding to a vertical projection area of the gas-guiding-component loading region 4215. The second section 4216*c* is hollowed out from the first surface 4211 to the second surface 4212 in a region where the first surface 4211 is extended from the vertical projection area of the gas-guiding-component loading region 4215. The first section 4216*b* and the second section 4216*c* are connected to form a stepped structure. Moreover, the first section 4216*b* of the gas-outlet groove 4216 is in communication with the ventilation hole 4215*a* of the gas-guiding-component loading region 4215, and the second section 4216*c* of the gas-outlet groove 4216 is in communication with the gas-outlet 4216*a*. In that, when first surface 4211 of the base 421 is attached and covered by the outer cover 426 and the second surface 4212 of the base 421 is attached and covered by the driving circuit board 423, the gas-outlet groove 4216 and the driving circuit board 423 collaboratively define an outlet path.

In the embodiment, the laser component 424 and the particulate sensor 425 are disposed on and electrically connected to the driving circuit board 423 and located within the base 421. In order to clearly describe and illustrate the positions of the laser component 424 and the particulate sensor 425 in the base 421, the driving circuit board 423 is intentionally omitted. The laser component 424 is accommodated in the laser loading region 4213 of the base 421, and the particulate sensor 425 is accommodated in the gas-inlet groove 4214 of the base 421 and is aligned to the laser component 424. In addition, the laser component 424 is spatially corresponding to the transparent window 4214*b*. Therefore, a light beam emitted by the laser component 424 passes through the transparent window 4214*b* and is irradiated into the gas-inlet groove 4214. A light beam path from the laser component 424 passes through the transparent window 4214*b* and extends in an orthogonal direction perpendicular to the gas-inlet groove 4214. Preferably but not exclusively, the particulate sensor 425 is used for detecting the suspended particulate information. In the embodiment, a projecting light beam emitted from the laser component 424 passes through the transparent window 4214*b* and enters the gas-inlet groove 4214 to irradiate the suspended particles contained in the gas passing through the gas-inlet groove 4214. When the suspended particles contained in the gas are irradiated and generate scattered light spots, the scattered light spots are received and calculated by the particulate sensor 425 to obtain the gas detection information. In the embodiment, the gas sensor 427 is positioned and disposed on the driving circuit board 423, electrically connected to the driving circuit board 423, and accommodated in the gas-outlet groove 4216, so as to detect the air pollution introduced into the gas-outlet groove 4216. Preferably but not exclusively, in an embodiment, the gas sensor 427 includes a volatile-organic-compound sensor for detecting the gas information of carbon dioxide ($CO_2$) or volatile organic compounds (TVOC). Preferably but not exclusively, in an embodiment, the gas sensor 427 includes a formaldehyde sensor for detecting the gas information of formaldehyde (HCHO). Preferably but not exclusively, in an embodiment, the gas sensor 427 includes a bacteria sensor for detecting the gas information of bacteria or fungi. Preferably but not exclusively, in an embodiment, the gas sensor 427 includes a virus sensor for detecting the gas information of virus. Preferably but not exclusively, the gas sensor 427 is a temperature and humidity sensor for the gas information of detecting the gas temperature and humidity.

Figure 7A:
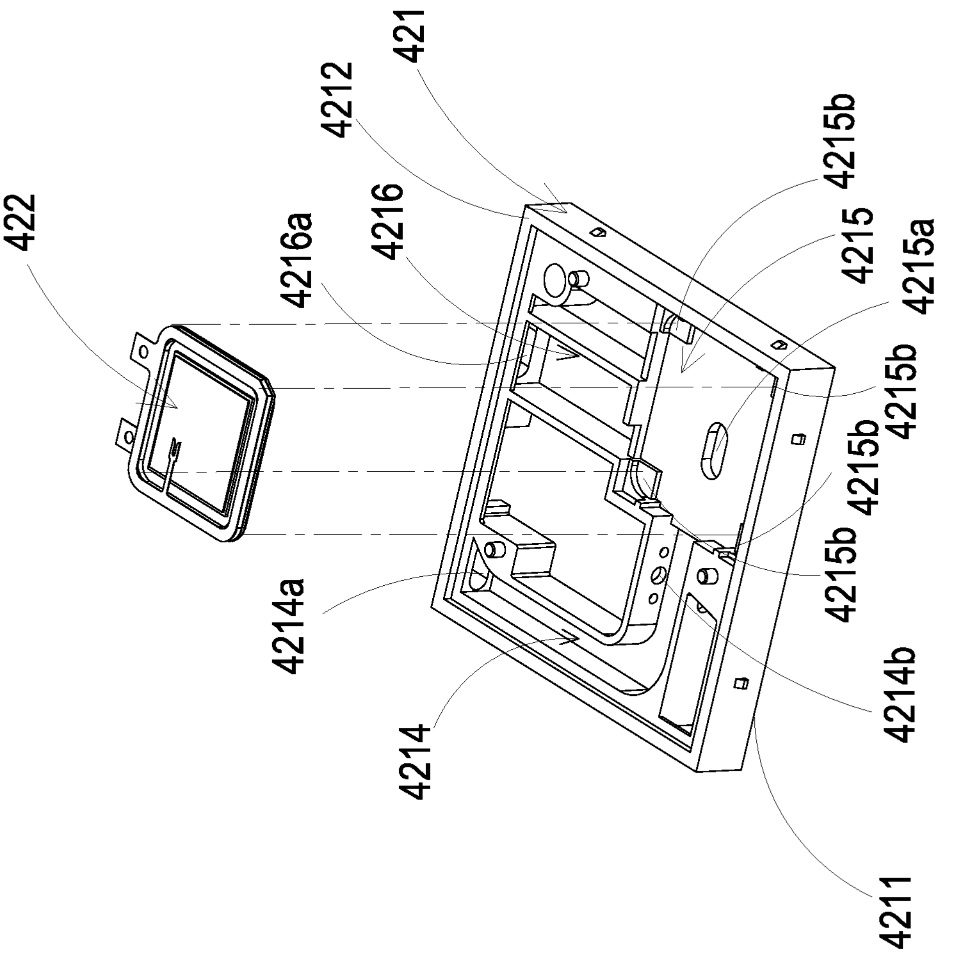
FIG. 7A is a schematic exploded view illustrating the combination of the piezoelectric actuator and the base of the gas detection main part of the gas detection module according to the embodiment of the present disclosure.
Figure 7B:
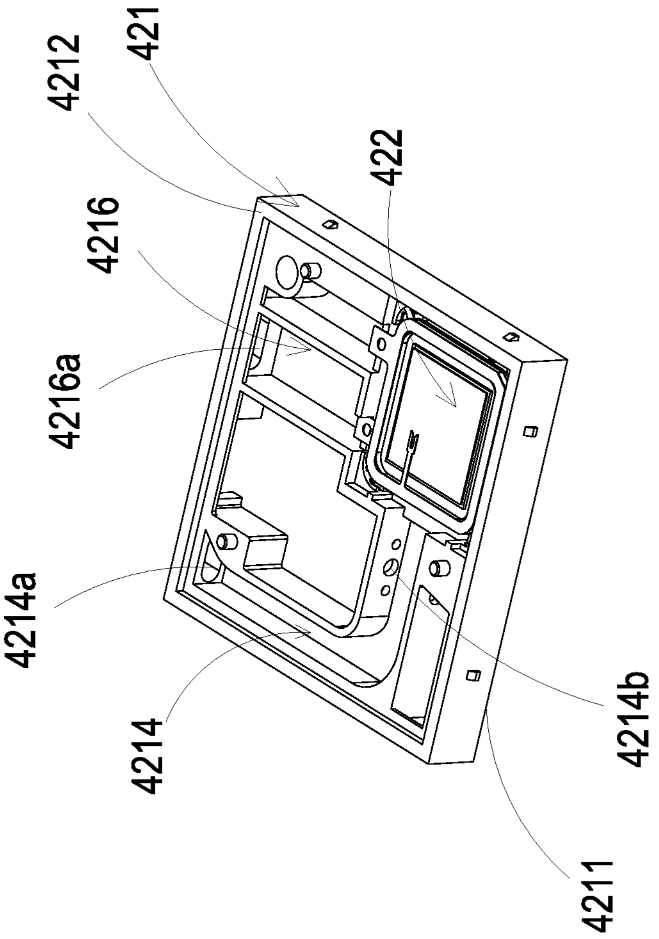
FIG. 7B is a schematic perspective view illustrating the combination of the piezoelectric actuator and the base of the gas detection main part of the gas detection module according to the embodiment of the present disclosure.

Please refer to FIGS. 7A and 7B. In the embodiment, the piezoelectric actuator 422 is accommodated in the square-shaped gas-guiding-component loading region 4215 of the base 421. In addition, the gas-guiding-component loading region 4215 of the base 421 is in fluid communication with the gas-inlet groove 4214. When the piezoelectric actuator 422 is enabled, the gas in the gas-inlet 4214 is inhaled into the piezoelectric actuator 422, flows through the ventilation hole 4215*a* of the gas-guiding-component loading region 4215 into the gas-outlet groove 4216. Moreover, the driving circuit board 423 covers the second surface 4212 of the base 421, and the laser component 424 is positioned and disposed on the driving circuit board 423, and is electrically connected to the driving circuit board 423. The particulate sensor 425 is also positioned and disposed on the driving circuit board 423, and is electrically connected to the driving circuit board 423. In that, when the outer cover 426 covers the base 421, the inlet opening 4261*a* is spatially corresponding to the gas-inlet 4214*a* of the base 421, and the outlet opening 4261*b* is spatially corresponding to the gas-outlet 4216*a* of the base 421.

Figure 8A:
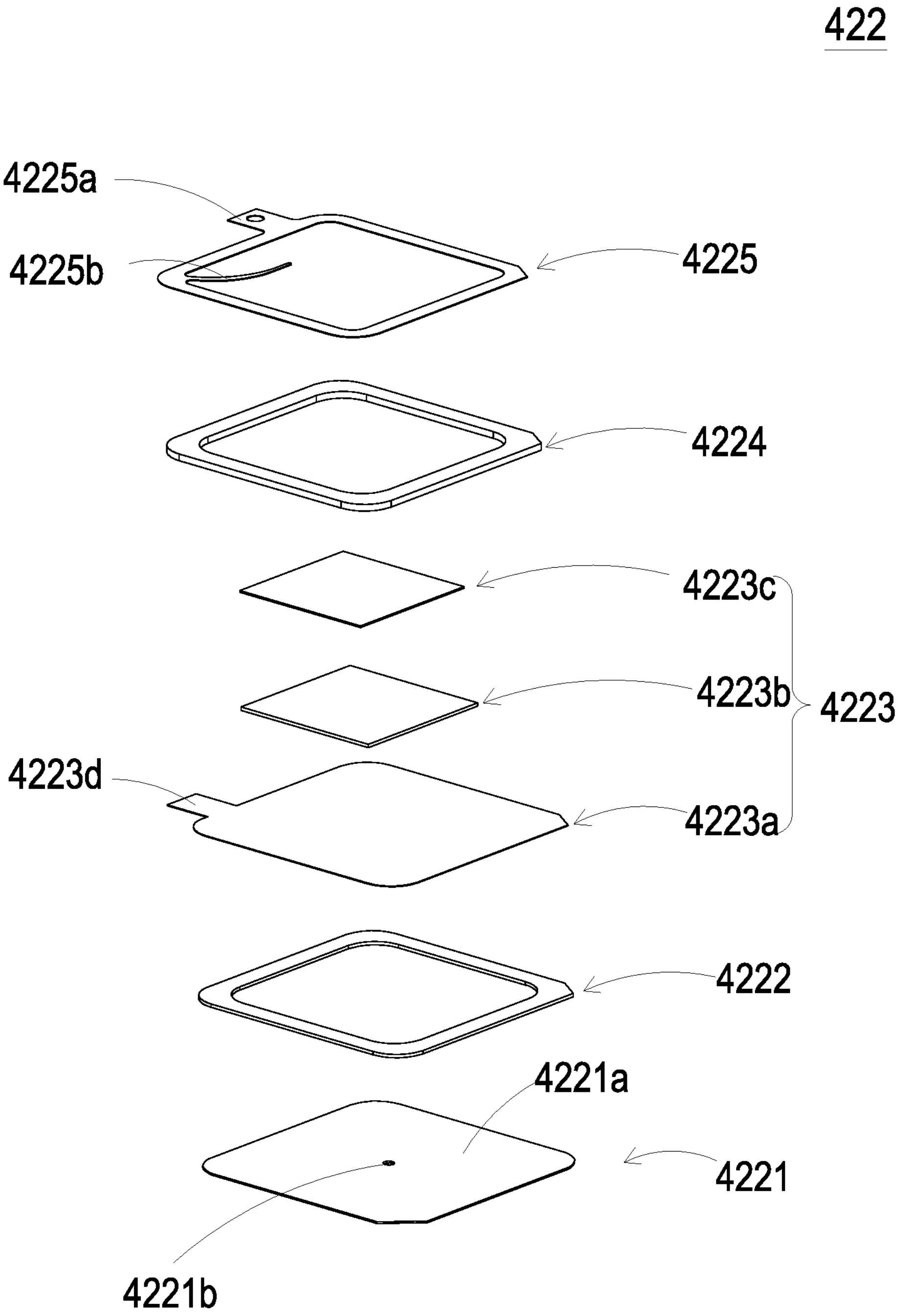
FIG. 8A is a schematic exploded front view illustrating the piezoelectric actuator of the gas detection main part of the gas detection module according to the embodiment of the present disclosure.
Figure 8B:
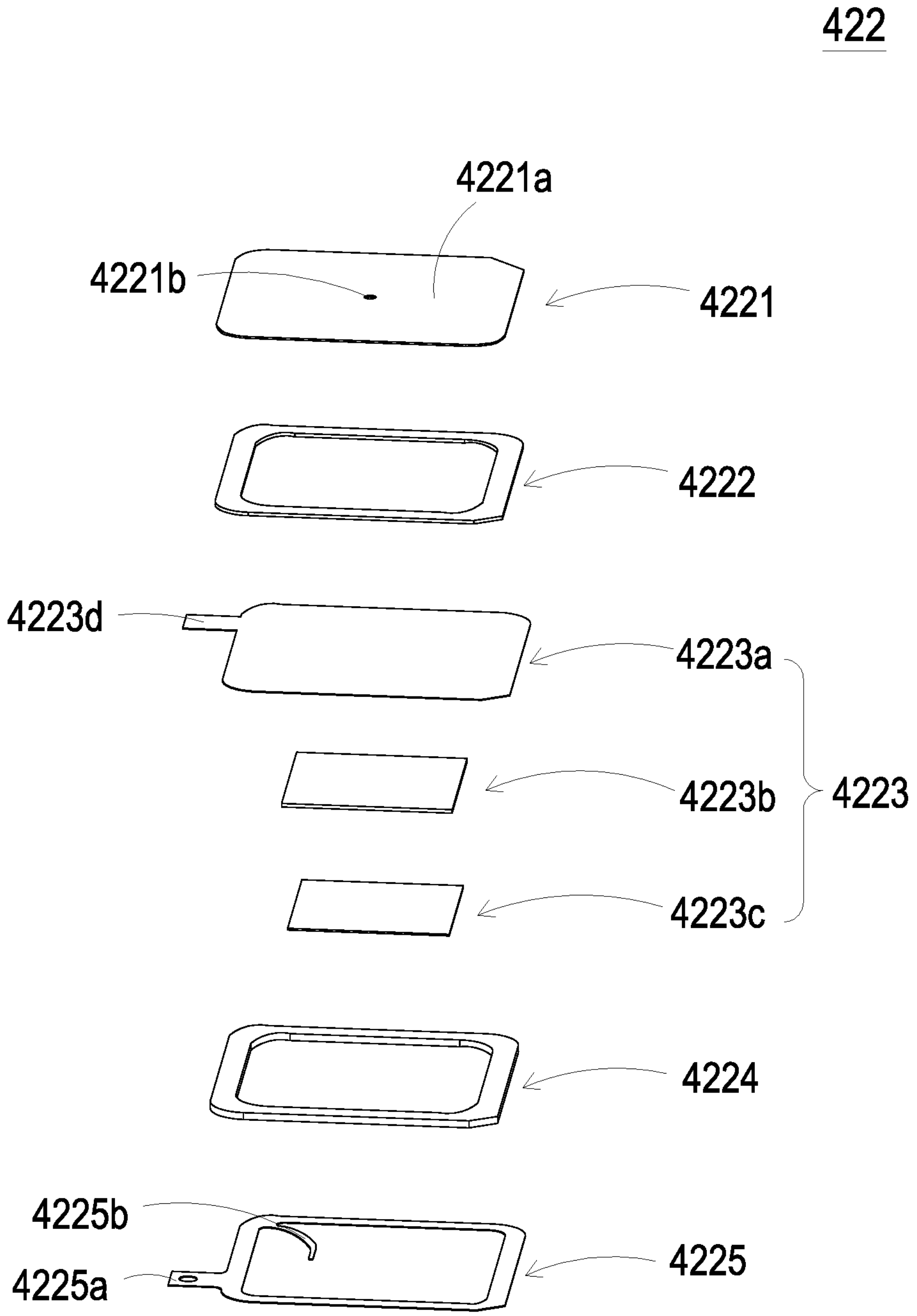
FIG. 8B is a schematic exploded rear view illustrating the piezoelectric actuator of the gas detection main part of the gas detection module according to the embodiment of the present disclosure.

Please refer to FIG. 8A and FIG. 8B. In the embodiment, the piezoelectric actuator 422 includes a gas-injection plate 4221, a chamber frame 4222, an actuator element 4223, an insulation frame 4224 and a conductive frame 4225. In the embodiment, the gas-injection plate 4221 is made by a flexible material and includes a suspension plate 4221*a* and a hollow aperture 4221*b*. The suspension plate 4221*a* is a sheet structure and is permitted to undergo a bending deformation. Preferably but not exclusively, the shape and the size of the suspension plate 4221a are accommodated in the inner edge of the gas-guiding-component loading region 4215, but not limited thereto. The hollow aperture 4221b passes through a center of the suspension plate 4221a, so as to allow the gas to flow therethrough. Preferably but not exclusively, in the embodiment, the shape of the suspension plate 4221a is selected from the group consisting of a square, a circle, an ellipse, a triangle and a polygon, but not limited thereto.

In the embodiment, the chamber frame 4222 is carried and stacked on the gas-injection plate 4221. In addition, the shape of the chamber frame 4222 is corresponding to the gas-injection plate 4221. The actuator element 4223 is carried and stacked on the chamber frame 4222. A resonance chamber 4226 is collaboratively defined by the actuator element 4223, the chamber frame 4222 and the suspension plate 4221a and is formed between the actuator element 4223, the chamber frame 4222 and the suspension plate 4221a. The insulation frame 4224 is carried and stacked on the actuator element 4223 and the appearance of the insulation frame 4224 is similar to that of the chamber frame 4222. The conductive frame 4225 is carried and stacked on the insulation frame 4224, and the appearance of the conductive frame 4225 is similar to that of the insulation frame 4224. In addition, the conductive frame 4225 includes a conducting pin 4225a and a conducting electrode 4225b. The conducting pin 4225a is extended outwardly from an outer edge of the conductive frame 4225, and the conducting electrode 4225b is extended inwardly from an inner edge of the conductive frame 4225.

Moreover, the actuator element 4223 further includes a piezoelectric carrying plate 4223a, an adjusting resonance plate 4223b and a piezoelectric plate 4223c. The piezoelectric carrying plate 4223a is carried and stacked on the chamber frame 4222. The adjusting resonance plate 4223b is carried and stacked on the piezoelectric carrying plate 4223a. The piezoelectric plate 4223c is carried and stacked on the adjusting resonance plate 4223b. The adjusting resonance plate 4223b and the piezoelectric plate 4223c are accommodated in the insulation frame 4224. The conducting electrode 4225b of the conductive frame 4225 is electrically connected to the piezoelectric plate 4223c. In the embodiment, the piezoelectric carrying plate 4223a and the adjusting resonance plate 4223b are made by a conductive material. The piezoelectric carrying plate 4223a includes a piezoelectric pin 4223d. The piezoelectric pin 4223d and the conducting pin 4225a are electrically connected to a driving circuit (not shown) of the driving circuit board 423, so as to receive a driving signal, such as a driving frequency and a driving voltage. Through this structure, a circuit is formed by the piezoelectric pin 4223d, the piezoelectric carrying plate 4223a, the adjusting resonance plate 4223b, the piezoelectric plate 4223c, the conducting electrode 4225b, the conductive frame 4225 and the conducting pin 4225a for transmitting the driving signal. Moreover, the insulation frame 4224 is insulated between the conductive frame 4225 and the actuator element 4223, so as to avoid the occurrence of a short circuit. Thereby, the driving signal is transmitted to the piezoelectric plate 4223c. After receiving the driving signal such as the driving frequency and the driving voltage, the piezoelectric plate 4223c deforms due to the piezoelectric effect, and the piezoelectric carrying plate 4223a and the adjusting resonance plate 4223b are further driven to generate the bending deformation in the reciprocating manner.

Furthermore, in the embodiment, the adjusting resonance plate 4223b is located between the piezoelectric plate 4223c and the piezoelectric carrying plate 4223a and served as a cushion between the piezoelectric plate 4223c and the piezoelectric carrying plate 4223a. Thereby, the vibration frequency of the piezoelectric carrying plate 4223a is adjustable. Basically, the thickness of the adjusting resonance plate 4223b is greater than the thickness of the piezoelectric carrying plate 4223a, and the vibration frequency of the actuator element 4223 can be adjusted by adjusting the thickness of the adjusting resonance plate 4223b. In the embodiment, the gas-injection plate 4221, the chamber frame 4222, the actuator element 4223, the insulation frame 4224 and the conductive frame 4225 are stacked and positioned in the gas-guiding-component loading region 4215 sequentially, so that the piezoelectric actuator 422 is supported and positioned in the gas-guiding-component loading region 4215. A plurality of clearances 4221c are defined between the suspension plate 4221a of the gas-injection plate 4221 and an inner edge of the gas-guiding-component loading region 4215 for gas flowing therethrough.

In the embodiment, a flowing chamber 4227 is formed between the gas-injection plate 4221 and the bottom surface of the gas-guiding-component loading region 4215. The flowing chamber 4227 is in communication with the resonance chamber 4226 between the actuator element 4223, the chamber frame 4222 and the suspension plate 4221a through the hollow aperture 4221b of the gas-injection plate 4221. By controlling the vibration frequency of the gas in the resonance chamber 4226 to be close to the vibration frequency of the suspension plate 4221a, the Helmholtz resonance effect is generated between the resonance chamber 4226 and the suspension plate 4221a, so as to improve the efficiency of gas transportation. When the piezoelectric plate 4223c is moved away from the bottom surface of the gas-guiding-component loading region 4215, the suspension plate 4221a of the gas-injection plate 4221 is driven to move away from the bottom surface of the gas-guiding-component loading region 4215 by the piezoelectric plate 4223c. In that, the volume of the flowing chamber 4227 is expanded rapidly, the internal pressure of the flowing chamber 4227 is decreased to form a negative pressure, and the gas outside the piezoelectric actuator 422 is inhaled through the clearances 4221c and enters the resonance chamber 4226 through the hollow aperture 4221b. Consequently, the pressure in the resonance chamber 4226 is increased to generate a pressure gradient. When the suspension plate 4221a of the gas-injection plate 4221 is driven by the piezoelectric plate 4223c to move toward the bottom surface of the gas-guiding-component loading region 4215, the gas in the resonance chamber 4226 is discharged out rapidly through the hollow aperture 4221b, and the gas in the flowing chamber 4227 is compressed, thereby the converged gas is quickly and massively ejected out of the flowing chamber 4227 under the condition close to an ideal gas state of the Benulli's law, and transported to the ventilation hole 4215a of the gas-guiding-component loading region 4215.

Figure 9A:
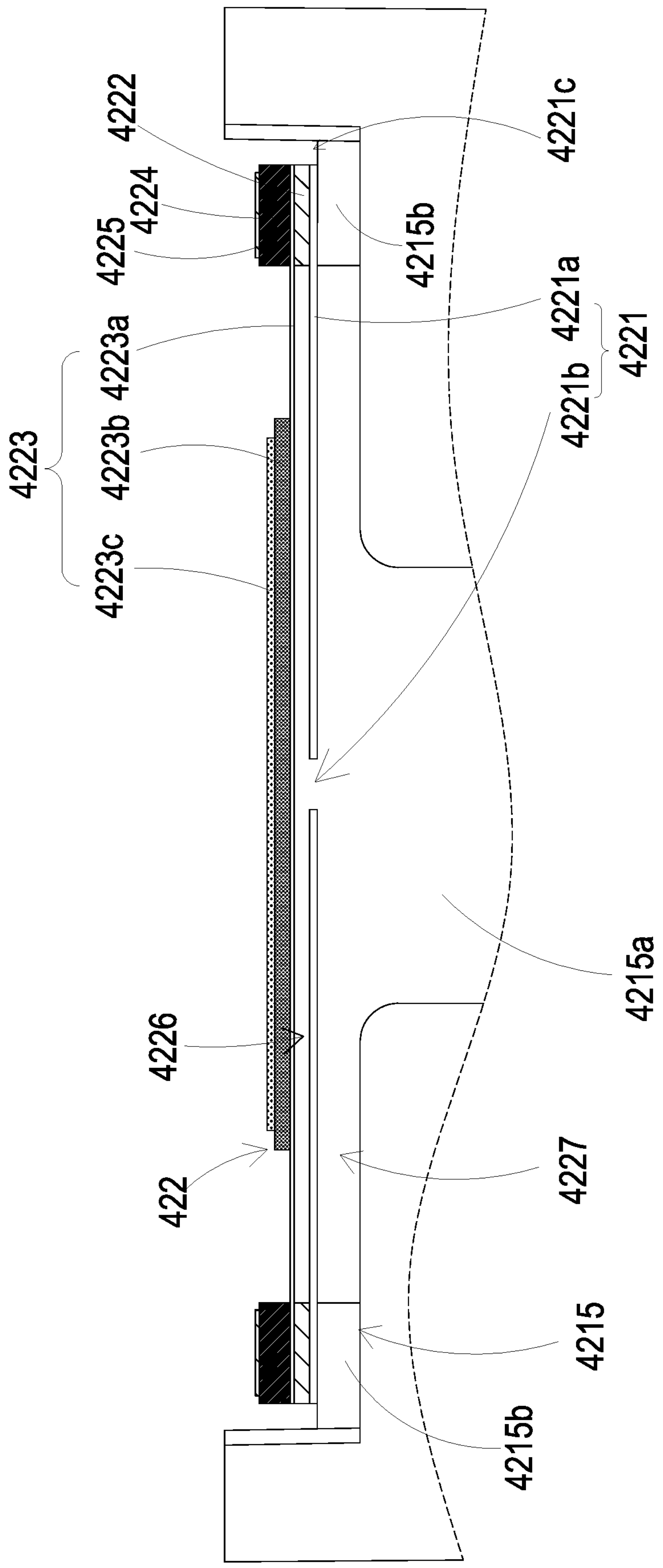
FIG. 9A is a schematic cross-sectional view illustrating the piezoelectric actuator of the gas detection main part of the gas detection module according to the embodiment of the present disclosure.
Figure 9B:
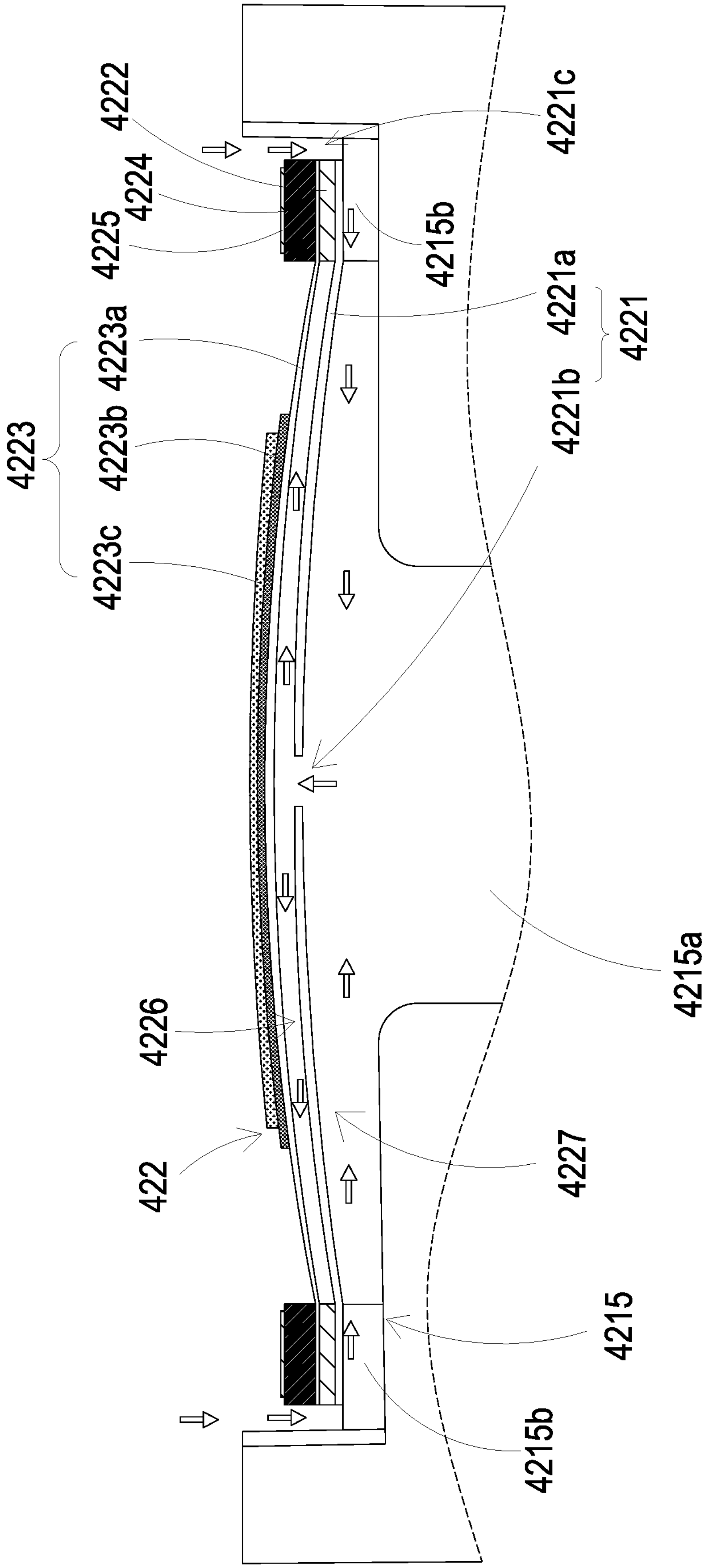
FIG. 9B is a schematic cross-sectional view illustrating a first operation step of the piezoelectric actuator of the gas detection main part of the gas detection module according to the embodiment of the present disclosure.
Figure 9C:
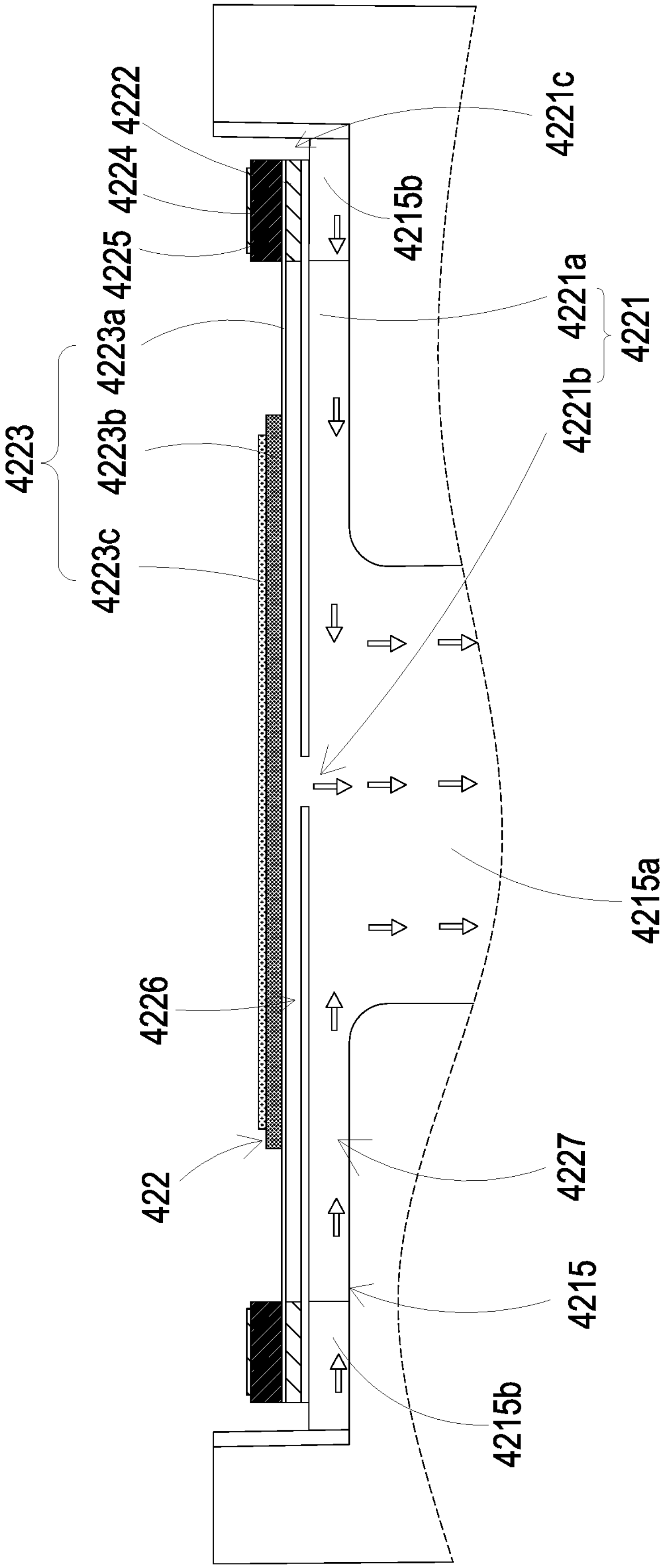
FIG. 9C is a schematic cross-sectional view illustrating a second operation step of the piezoelectric actuator of the gas detection main part of the gas detection module according to the embodiment of the present disclosure.

By repeating the above operation steps shown in FIG. 9B and FIG. 9C, the piezoelectric plate 4223c is driven to generate the bending deformation in a reciprocating manner. According to the principle of inertia, since the gas pressure inside the resonance chamber 4226 is lower than the equilibrium gas pressure after the converged gas is ejected out, the gas is introduced into the resonance chamber 4226 again. Moreover, the vibration frequency of the gas in the resonance chamber 4226 is controlled to be close to the vibration frequency of the piezoelectric plate 4223c, so as to generate the Helmholtz resonance effect to achieve the gas transportation at high speed and in large quantities.

Figure 10A:
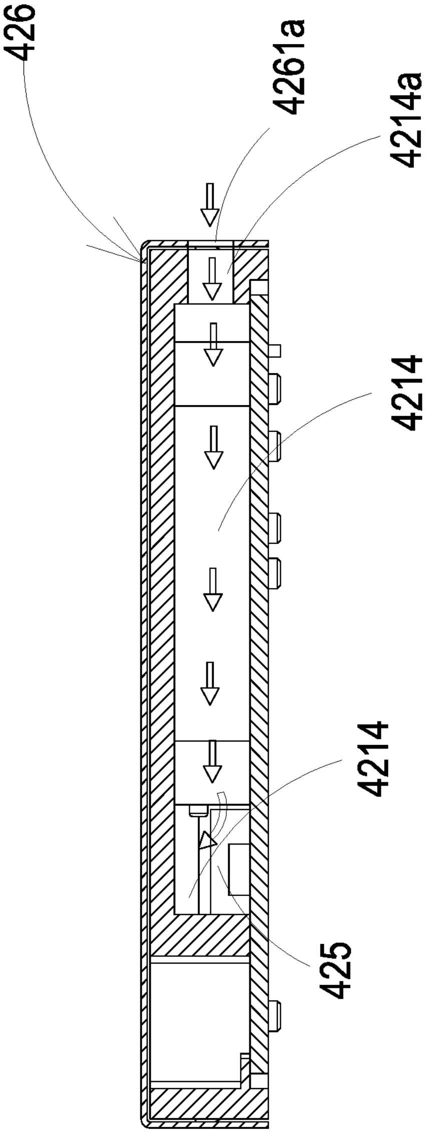
FIG. 10A is a schematic cross-sectional view illustrating the air flow path of the gas detection main part of the gas detection module according to the embodiment of the present disclosure.
Figure 10B:
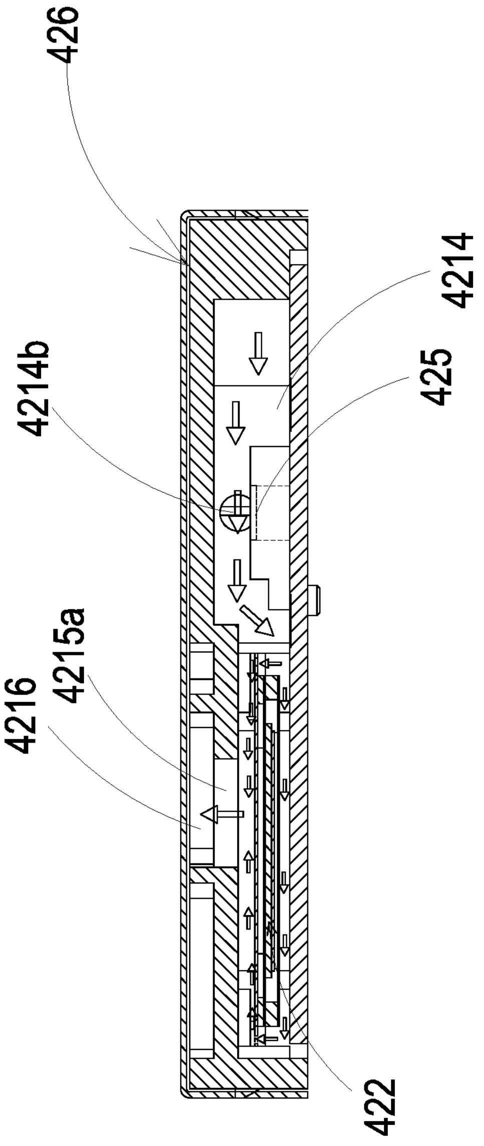
FIG. 10B is a schematic cross-sectional view illustrating the detection of the gas passing through the gas detection main part of the gas detection module according to the embodiment of the present disclosure.
Figure 10C:
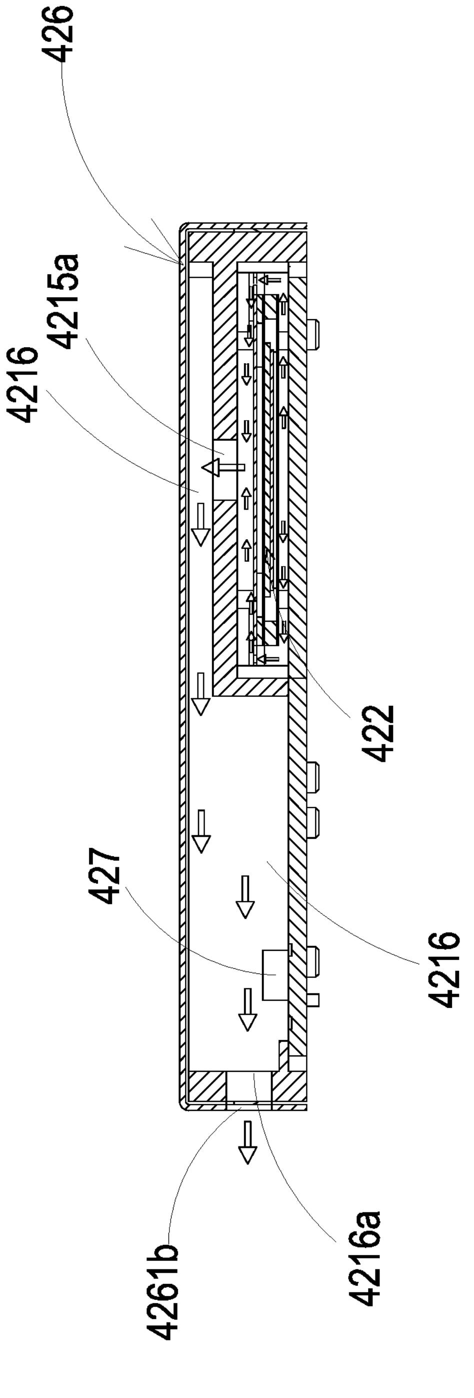
FIG. 10C is a schematic cross-sectional view illustrating the discharging of the gas from gas detection main part of the gas detection module according to the embodiment of the present disclosure.

Please refer to FIG. 10A to FIG. 10C. The gas is inhaled through the inlet opening 4261*a* of the outer cover 426, flows into the gas-inlet groove 4214 of the base 421 through the gas-inlet 4214*a*, and is transported to the position of the particulate sensor 425. The piezoelectric actuator 422 is enabled continuously to inhale the gas into the inlet path, and facilitate the gas outside the gas detection module to be introduced rapidly, flow stably, and transported above the particulate sensor 425. At this time, a projecting light beam emitted from the laser component 424 passes through the transparent window 4214*b* to irritate the suspended particles contained in the gas flowing above the particulate sensor 425 in the gas-inlet groove 4214. When the suspended particles contained in the gas are irradiated and generate scattered light spots, the scattered light spots are received and calculated by the particulate sensor 425 for obtaining related information about the sizes and the concentration of the suspended particles contained in the gas. Moreover, the gas above the particulate sensor 425 is continuously driven and transported by the piezoelectric actuator 422, flows into the ventilation hole 4215*a* of the gas-guiding-component loading region 4215, and is transported to the gas-outlet groove 4216. At last, after the gas flows into the gas outlet groove 4216, the gas is continuously transported into the gas-outlet groove 4216 by the piezoelectric actuator 422, and thus the gas in the gas-outlet groove 4216 is pushed to discharge through the gas-outlet 4216*a* and the outlet opening 4261*b*.

Please refer to FIG. 1A and FIG. 1B. The above-mentioned filtration and purification component 3 can be a combination of various implementation. Preferably but not exclusively, in an embodiment, the filtration and purification component 3 is an activated carbon 31. Preferably but not exclusively, in an embodiment, the filtration and purification component 3 is a high efficiency particulate air (HEPA) filter screen 32. In other embodiments, the filtration and purification component 3 includes an activated carbon 31, a high efficiency particulate air (HEPA) filter screen 32 and a zeolite screen 33. In an embodiment, the activated carbon 31 or the HEPA filter screen 32 is coated with a cleansing factor containing chlorine dioxide layer, so as to inhibit viruses, bacteria, fungi, influenza A, influenza B, enterovirus and norovirus in the air pollution source introduced into the filtration and purification component 3, and the inhibition ratio can reach 99%, thereby reducing the cross-infection of viruses. In some embodiment, the activated carbon 31 or the HEPA filter screen 32 is coated with an herbal protective layer extracted from ginkgo and Japanese *Rhus chinensis* to form an herbal protective anti-allergic filter, so as to resist allergy effectively and destroy a surface protein of influenza virus (H1N1) passing through the HEPA filter screen 32. In some embodiment, the activated carbon 31 or the HEPA filter screen 32 is coated with a silver ion, so as to inhibit viruses, bacteria and fungi contained in the air pollution source.

In the embodiment, the activated carbon 31 is configured to filter and absorb the particulate matter 2.5 ($PM_{2.5}$), the zeolite screen 33 is configured to filter and absorb the volatile organic compounds (VOC), and the HEPA filter screen 32 is configured to absorb the chemical smoke, the bacteria, the dust particles and the pollen contained in the gas, so that the air pollution source introduced into the filtration and purification component 3 is filtered and purified to achieve the effect of filtering and purification.

In an embodiment, the filtration and purification component 3 includes the combination of an activated carbon 31, a high efficiency particulate air (HEPA) filter screen 32 and a zeolite screen 33, and a phot-catalyst unit 34. In that, when the air pollution source from the outdoor space B is introduced into the filtration and purification component 3, the light energy is converted into the chemical energy by the photo-catalyst unit 34, thereby decomposing harmful gases in the air pollution source and disinfecting bacteria contained therein, so as to achieve the effects of filtering and purifying.

In an embodiment, the filtration and purification component 3 includes the combination of an activated carbon 31, a high efficiency particulate air (HEPA) filter screen 32 and a zeolite screen 33, and a photo-plasma unit 35. The photo-plasma unit 35 includes a nanometer irradiation tube. The air pollution source introduced by the filtration and purification component 3 is irradiated by the nanometer irradiation tube to decompose and purify volatile organic compounds contained in the air pollution source. When the air pollution source is introduced by the filtration and purification component 3, the introduced gas is irradiated by the nanometer irradiation tube, thereby oxygen molecules and water molecules contained in the air pollution are decomposed into high oxidizing photo-plasma, and generates an ion flow capable of destroying organic molecules. In that, volatile formaldehyde, volatile toluene and volatile organic compounds (VOC) contained in the air pollution are decomposed into water and carbon dioxide, so as to achieve the effects of filtering and purifying.

In an embodiment, the filtration and purification component 3 includes the combination of an activated carbon 31, a high efficiency particulate air (HEPA) filter screen 32 and a zeolite screen 33, and a negative ionizer 36. Preferably but not exclusively, the negative ionizer 36 includes a dust collecting plate. When the air pollution source of the outdoor space B introduced into the filtration and purification component 3 passes through a high voltage discharge, it makes the suspended particles in the air pollution source to carry with positive charge and adhered to the dust collecting plate carry with negative charges, so as to achieve the effects of filtering and purifying the air pollution source introduced.

In an embodiment, the filtration and purification component 3 includes the combination of an activated carbon 31, a high efficiency particulate air (HEPA) filter screen 32 and a zeolite screen 33, and a plasma ion unit 37. A high-voltage plasma column with plasma ion is formed by the plasma ion unit 37, so as to decompose viruses or bacteria contained in the air pollution source of the outdoor space B introduced into the filtration and purification component 3. The oxygen molecules and water molecules contained in the air pollution source are decomposed into positive hydrogen ions ($H^+$) and negative oxygen ions ($O_2^-$) by the plasma ion. The substances attached with water around the ions are adhered on the surface of viruses and bacteria and converted into OH radicals with extremely strong oxidizing power, thereby removing hydrogen (H) from the protein on the surface of viruses and bacteria, and thus decomposing (oxidizing) the protein, so as to filter the introduced air pollution source and achieve the effects of filtering and purifying.

In an embodiment, the filtration and purification component 3 may merely include the HEPA filter screen 32. In an embodiment, the HEPA filter screen 32 is combined with any one of the phot-catalyst unit 34, the photo-plasma unit 35, the negative ionizer 36 and the plasma ion unit 37. In an embodiment, the HEPA filter screen 32 is combined with a combination of any two of the phot-catalyst unit 34, the photo-plasma unit 35, the negative ionizer 36 and the plasma ion unit 37. In an embodiment, the HEPA filter screen 32 is combined with a combination of any three of the phot-catalyst unit 34, the photo-plasma unit 35, the negative ionizer 36 and the plasma ion unit 37. Alternatively, the HEPA filter screen 32 is combined with the phot-catalyst unit 34, the photo-plasma unit 35, the negative ionizer 36 and the plasma ion unit 37.

In brief, in some embodiments, the filtration and purification component 3 is one selected from the group consisting of the activated carbon 31, a high efficiency particulate air (HEPA) filter screen 32, the zeolite screen 33, a photo-catalyst unit 34, a photo-plasma unit 35, a negative ionizer 36, a plasma ion unit 37 and a combination thereof.

In the embodiment, the air pollution source is at least one selected from the group consisting of particulate matter, carbon monoxide, carbon dioxide, ozone, sulfur dioxide, nitrogen dioxide, lead, total volatile organic compounds (TVOC), formaldehyde, bacteria, fungi, virus and a combination thereof.

In the embodiment, the microcontroller 5 receives the gas detection datum of the gas detection module 4 through a wireless communication transmission, and intelligently compares the gas detection datum under the surveillance status. The surveillance status is activated as the gas detection datum of the air pollution source detected by the gas detection module 4 exceeds the safety detection value. Preferably but not exclusively, the safety detection value includes at least one selected from the group consisting of a concentration of PM2.5 which is less than 35 $\mu g/m^3$, a concentration of carbon dioxide which is less than 1000 ppm, a concentration of total volatile organic compounds which is less than 0.56 ppm, a concentration of formaldehyde which is less than 0.08 ppm, a colony-forming unit of bacteria which is less than 1500 $CFU/m^3$, a colony-forming unit of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, and a concentration of lead which is less than 0.15 $\mu g/m^3$.

From the above description, the present disclosure provides a range hood for preventing air pollution. The status of the air quality around the environment is understood by detecting the indoor air quality through the gas detection module 4 in real time and at any time. Moreover, the gas guider 2 is utilized to guide and divert the air pollution source, so that the air pollution can be filtered in real time through the filtration and purification component 3. The microcontroller 5 is further utilized to receive the datum detected by the gas detection module 4 to control the enablement of the gas guider 2 and adjust the guiding air-flow volume, so as to achieve an autonomous detection mode of the range hood for preventing air pollution of the present invention, thereby the air quality in the environment can be detected and the air pollution source can be filtered and processed in real time.

Please refer to FIG. 1B. In some embodiments, the range hood for preventing air pollution of the present invention is connected with a cloud computing system 7. The microcontroller 5 performs a two-way communication transmission to the cloud computing system 7 through the wireless communication transmission, so as to transmit the gas detection datum detected by the gas detection module 4 of the range hood to the cloud computing system 7, and receive the information transmitted from the cloud computing system 7, thereby issuing the driving instruction for controlling the enablement of the gas guider 2 and adjusting the guiding air-flow volume. In addition, notably, the enablement of the gas guider 2 or the value of the guiding air-flow volume can be controlled manually through the microcontroller 5 directly. Alternatively, the value of guiding air-flow volume can be adjusted automatically through the artificial intelligence of the cloud computing system 7, and the driving instruction is issued to adjust the guiding air-flow volume of the gas guider 2. That is, as the gas detection datum is larger than the safety detection value, the guiding air-flow volume of the gas guider 2 is adjusted to be larger. As the gas detection datum is closer to the safety detection value, the guiding air-flow volume of the gas guider 2 is adjusted to be smaller. In addition, notably, if a plurality of range hoods are disposed in the indoor space, the cloud computing system 7 which receives the different gas detection data detected by the gas detection modules 4 of the range hoods disposed in different locations may transmits different control signals to the corresponding different range hoods in according to the different air quality conditions detected by different range hoods, thereby the enablement of the gas guider 2 can be controlled and the guiding air-flow volume can be adjusted by the microcontroller 5.

Figure 2:
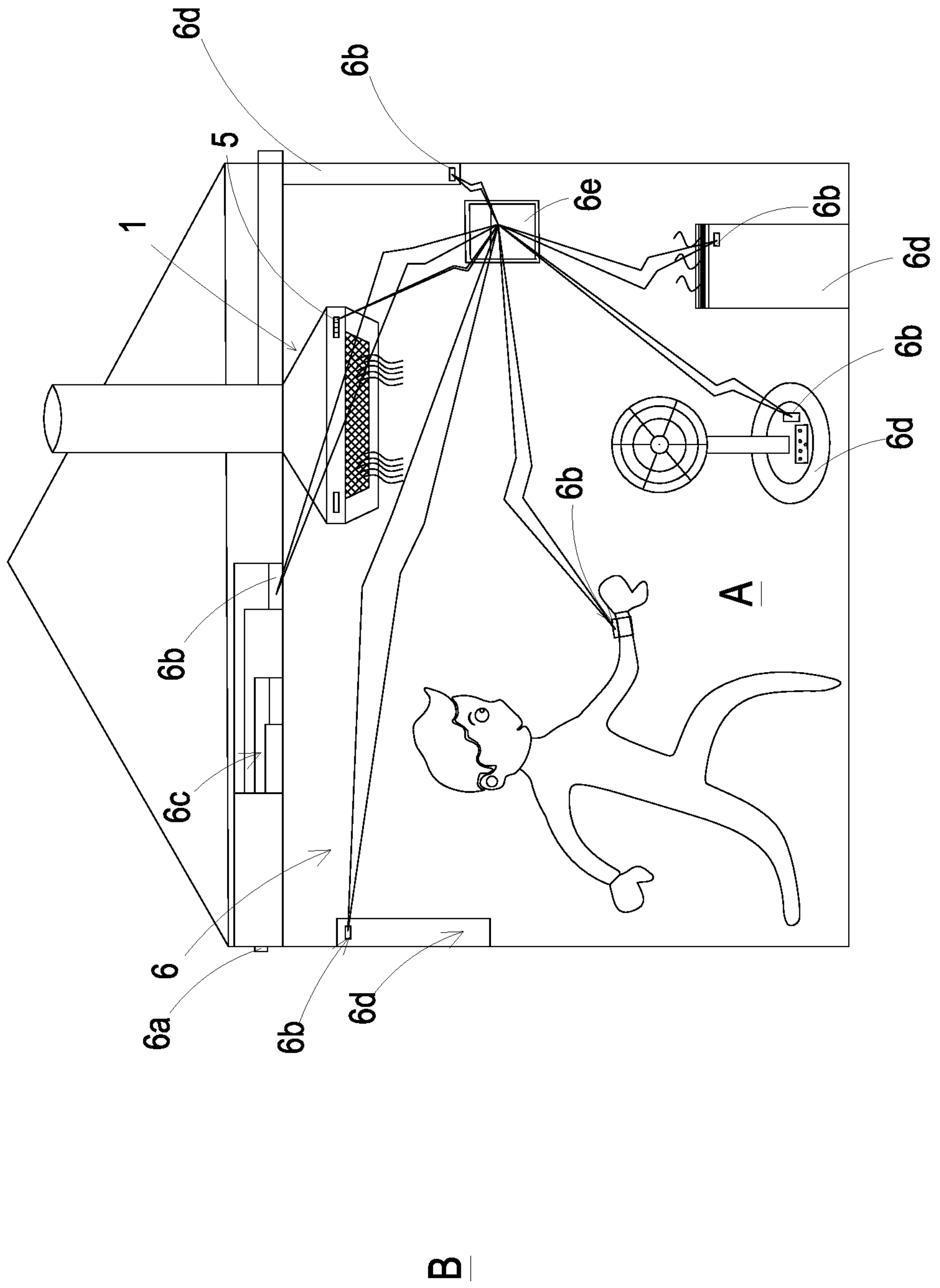
FIG. 2 is a schematic view illustrating the range hood for preventing air pollution connected to a pollution processing system according to the embodiment of the present disclosure.
Figure 3:
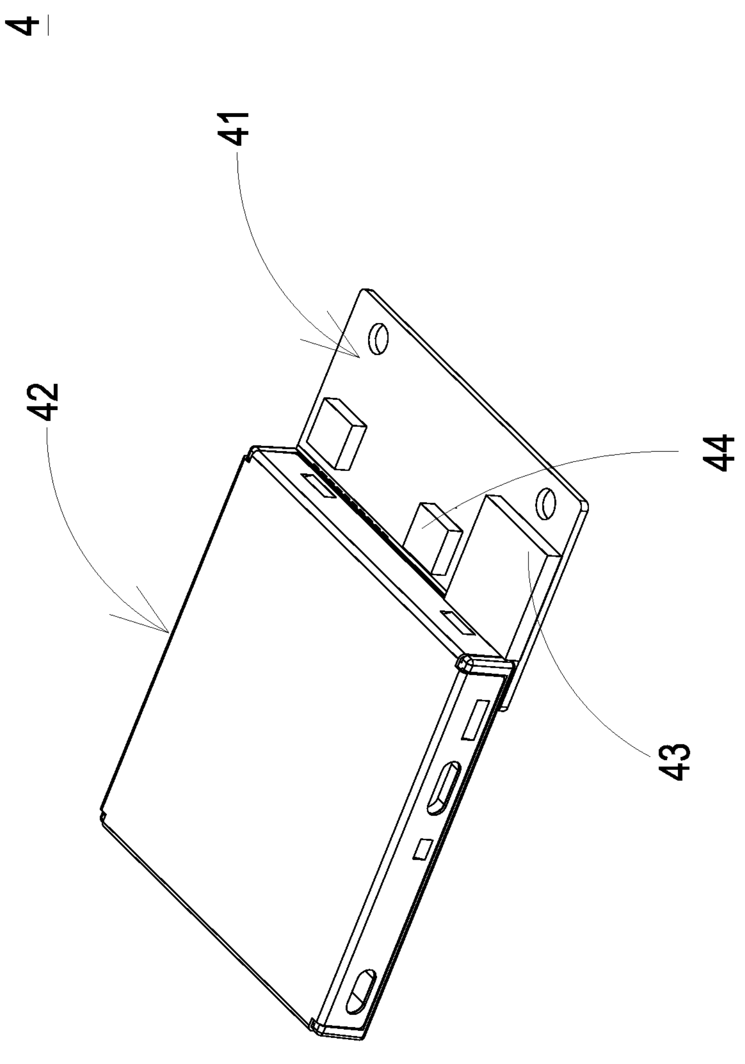
FIG. 3 is a schematic perspective view illustrating the gas detection module of the range hood according to the embodiment of the present disclosure.
Figure 4A:
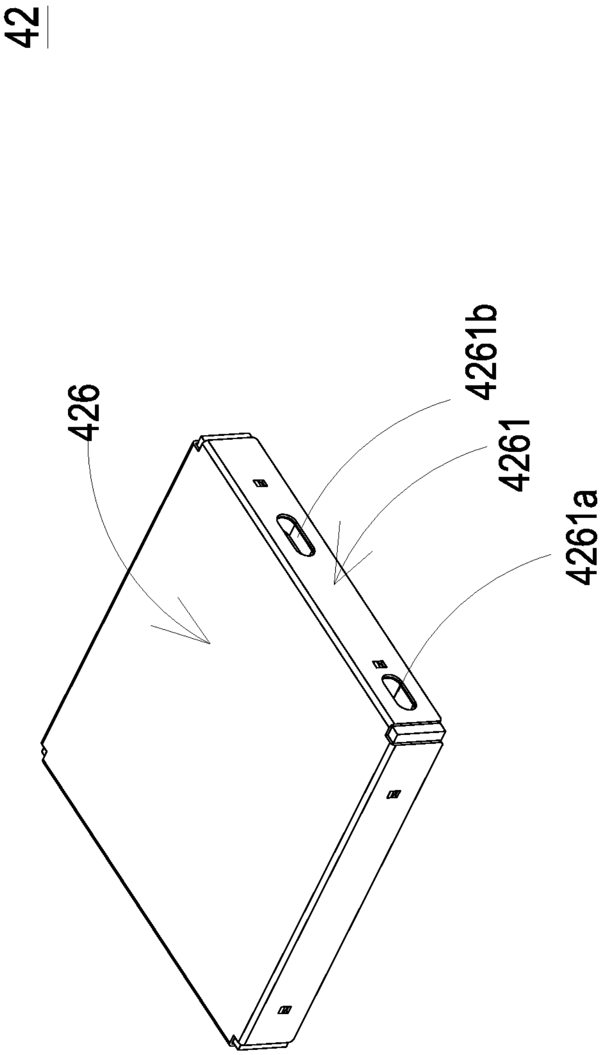
FIG. 4A is a schematic front perspective view illustrating the gas detection main part of the gas detection module according to the embodiment of the present disclosure.
Figure 4B:
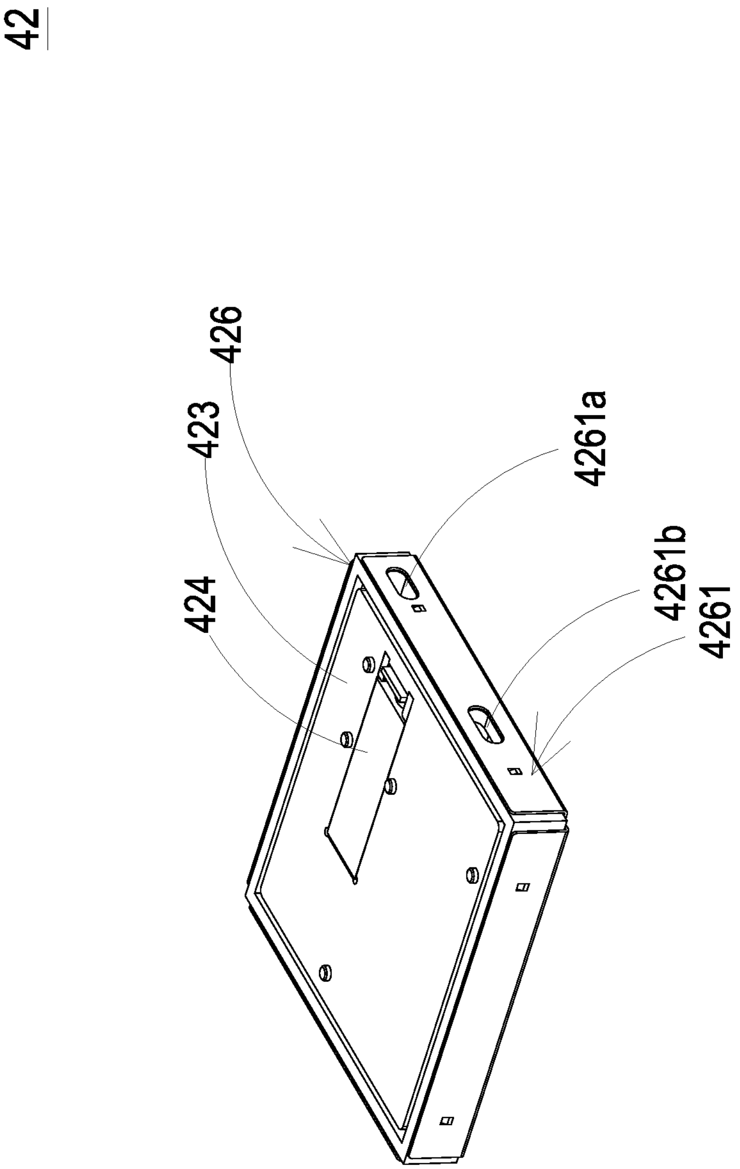
FIG. 4B is a schematic rear perspective view illustrating the gas detection main part of the gas detection module according to the embodiment of the present disclosure.
Figure 4C:
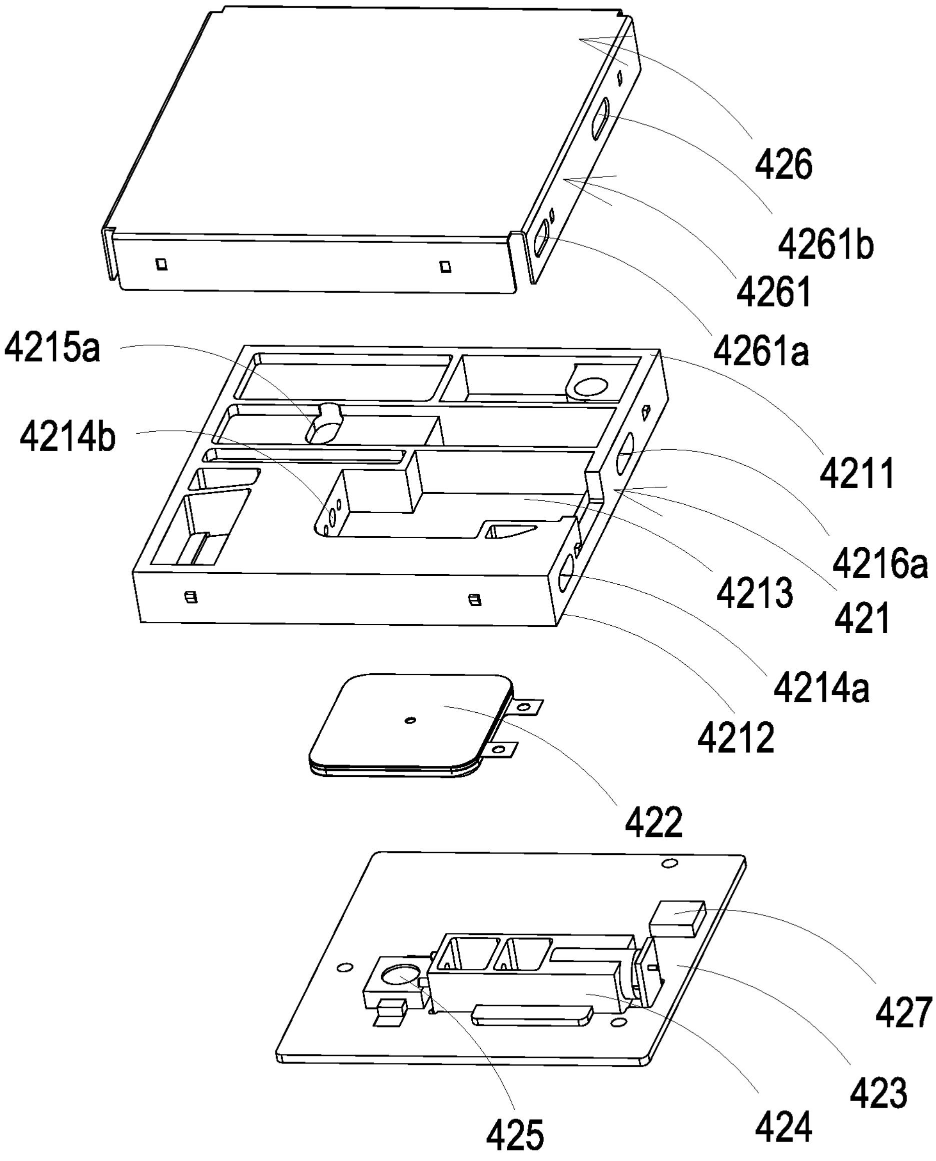
FIG. 4C is an exploded view illustrating the gas detection main part of the gas detection module according to the embodiment of the present disclosure.
Figure 5A:
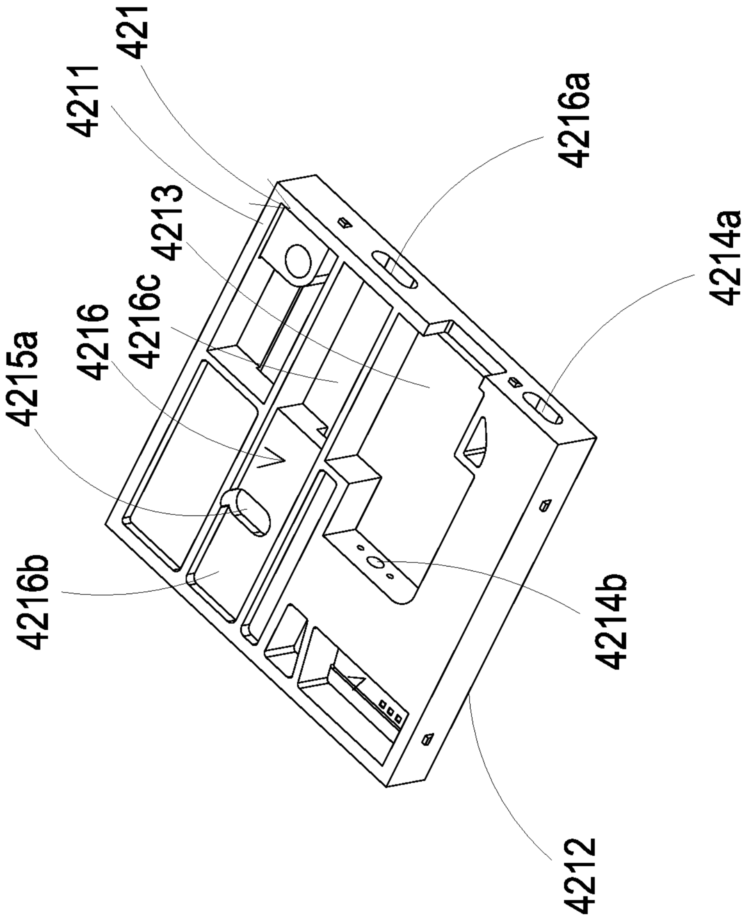
FIG. 5A is a schematic front perspective view illustrating the base of the gas detection main part of the gas detection module according to the embodiment of the present disclosure.
Figure 5B:
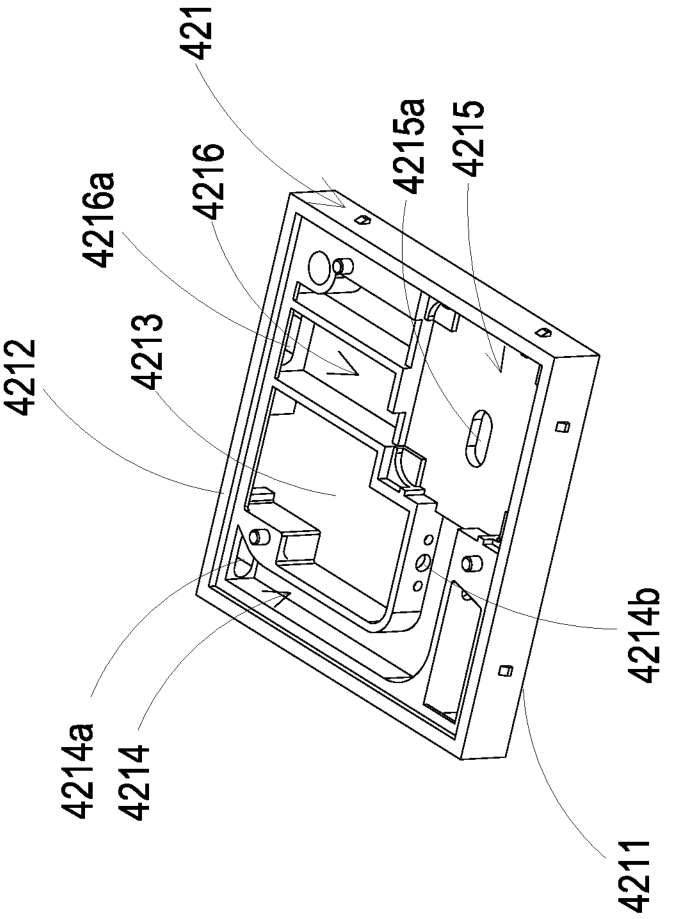
FIG. 5B is a schematic rear perspective view illustrating the base of the gas detection main part of the gas detection module according to the embodiment of the present disclosure.

Please refer to FIG. 2. In some embodiments, the range hood for preventing air pollution of the present invention is connected with a pollution processing system 6. The microcontroller 5 performs a two-way communication transmission to the pollution processing system 6 through the wireless communication transmission, so as to transmit the gas detection datum detected by the gas detection module 4 of the range hood to the pollution processing system 6 by the microcontroller 5, and receive information transmitted from the pollution processing system 6 by the microcontroller 5, so as to issue the driving instruction for controlling the enablement of the gas guider 2 and adjusting the guiding air-flow volume.

In the embodiment, the pollution processing system 6 includes at least one outdoor gas detection module 6*a*, at least one indoor gas detection module 6*b*, at least one gas-exchanging processing device 6*c*, at least one indoor cleaning and filtration device 6*d* and an intelligent control-driving processing device 6*e*.

In the embodiment, the at least one outdoor gas detection module 6*a* is disposed in an outdoor space B to detect the air pollution source in the outdoor space B and transmit an outdoor gas detection datum, and the at least one indoor gas detection module 6*b* is disposed in an indoor space A to detect the air pollution source in the indoor space A and transmit the indoor gas detection datum. Notably, the enablement of the gas guider 2 or the value of the guiding air-flow volume can be controlled manually through the microcontroller 5 directly. Alternatively, the value of guiding air-flow volume can be adjusted automatically through the artificial intelligence of the pollution processing system 6, and the driving instruction is issued to adjust the guiding air-flow volume of the gas guider 2. The outdoor gas detection module 6*a* is disposed in the outdoor space B to detect the air pollution source in the outdoor space B and transmit the outdoor gas detection datum, and the indoor gas detection module 6*b* is disposed in the indoor space A to detect the air pollution source in the indoor space A and transmit the indoor gas detection datum. Preferably but not exclusively, the outdoor gas detection module 6*a* or the indoor gas detection module 6*b* has the gas detection module 4 for detecting the air quality and outputting the gas detection datum.

The at least one gas-exchanging processing device 6*c* is configured to control the introduction of an outdoor gas of the outdoor space B into the indoor space A, so as to exchange and filter the air pollution source in the indoor space A. The at least one indoor cleaning and filtration device 6*d* is enabled to filter and exchange the air pollution source in the indoor space A. After the intelligent control-driving processing device 6*e* receives and compares the outdoor gas detection datum and the indoor gas detection datum, the intelligent control-driving processing device intelligently and selectively controls the introduction of the outdoor gas of the outdoor space B by at least one gas-exchange processing device 6*c*.

In the embodiment, after the intelligent control-driving processing device 6*e* receives and compares the outdoor gas detection datum and the indoor gas detection datum, the intelligent control-driving processing device intelligently and selectively controls the introduction of the outdoor gas of the outdoor space B by at least one gas-exchange processing device 6*c*. Moreover, the at least one intelligent control-driving processing device 6*e* controls the at least one indoor cleaning and filtration device 6*d* to be enabled in real time, thereby allowing the air pollution source in the indoor space A passes through the at least one indoor cleaning and filtration device 6*d*, and allowing the air pollution source in the indoor space A to be filtered and exchanged to become a fresh air. Notably, the at least one indoor cleaning and filtration device 6*d* is selected from the group consisting of an air conditioner, a cooker hood, a ventilator, a cleaner, a vacuum cleaner, a range hood an electric fan and a combination thereof. Each indoor cleaning and filtration device 6*d* is equipped with the indoor gas detection module 6*b* to detect the air pollution source in the indoor space A, and control the enablement and operation of the indoor cleaning and filtration device 6*d*.

Therefore, after the intelligent control-driving processing device 6*e* receives and compares the outdoor gas detection datum and the indoor gas detection datum, and determines that the indoor gas detection datum is inferior to the outdoor gas detection datum, the control signal is transmitted to the gas-exchange processing device 6*c* to introduce the outdoor gas into the indoor space A. Moreover, the controlling instruction is transmitted to enable at least one of the indoor cleaning and filtration devices 6*d* to filter and purify, but not limited thereto.

Certainly, after the intelligent control-driving processing device 6*e* receives and compares the outdoor gas detection datum and the indoor gas detection datum, the intelligent control-driving processing device 6*e* can intelligently and selectively issues the controlling instruction to enable at least one of the indoor cleaning and filtration devices 6*d* or intelligently and selectively issues the controlling instruction to enable the microcontroller 5 of the range hood, thereby the microcontroller 5 issues the driving instruction for controlling the enablement of the gas guider 2 and adjusting the guiding air-flow volume, so that the air pollution source in the indoor space A can be filtered and exchanged to become another fresh air.

Please refer to FIG. 2. In the embodiment, at least three indoor gas detection modules 6*b* are utilized. The intelligent control-driving processing device 6*e* receives and compares the indoor gas detection data outputted by the at least three indoor gas detection modules 6*b* under the calculation of artificial intelligence, so as to find the location of the air pollution source in the indoor space A, and intelligently select and control to enable the gas-exchanging processing device 6*c* or the indoor cleaning and filtration device 6*d* adjacent to the air pollution source, so as to accelerate the guiding operation of the air pollution source and keep the air pollution source without diffusion. In an embodiment, the intelligent control-driving processing device 6*e* receives and compares the indoor gas detection data outputted by the at least three indoor gas detection modules 6*b* under the calculation of artificial intelligence, so as to find the location of the air pollution source in the indoor space A, and intelligently select and control to enable the gas-exchanging processing device 6*c* or the indoor cleaning and filtration device 6*d* adjacent to the air pollution source preferentially to inhale the air pollution source, wherein the intelligent control-driving processing device 6*e* selects and controls to enable the rest of the indoor cleaning and filtration devices 6*d* to exhaust under the calculation of artificial intelligence, so as to generate an airflow and guide the air pollution source toward the indoor cleaning and filtration device 6*d* adjacent to the air pollution source to be inhaled for filtering rapidly.

In summary, the present disclosure provides a range hood for preventing air pollution capable of detecting the status of the air quality around the environment in real time through detecting the indoor air quality by the gas detection module, and guiding the air pollution source through the gas guider, so as to filter the air pollution in real time through the filtration and purification component. Moreover, the enablement of the gas guider and the adjustment of the guiding air-flow volume can be controlled by the microcontroller according to the received datum detected by the gas detection module, so that the air quality in the environment can be detected and the air pollution source can be filtered and processed in real time. In that, the range hood for preventing air pollution of the present invention not only can detect the air quality in the environment autonomously, but also construct a complete real-time air processing system as in connection with the cloud computing system and/or the indoor pollution processing system.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A range hood for preventing air pollution, comprising:

a main body configured to form a diversion path;

a gas guider disposed in the diversion path, and comprising a centrifugal fan configured for guiding an air convection;

a filtration and purification component disposed in the diversion path, wherein the filtration and purification component is one selected from the group consisting of the activated carbon, the high efficiency particulate air (HEPA) filter screen, the zeolite screen, a photo-catalyst unit, a photo-plasma unit, a negative ionizer, a plasma ion unit and a combination thereof, and configured for filtering and purifying an air pollution source contained in the air convection guided by the gas guider;

at least one gas detection module disposed in the diversion path, wherein the at least one gas detection module comprises a gas sensor and a communicator, and the gas sensor is configured for detecting the air pollution source, and the communicator is configured for transmitting a gas detection datum; and a microcontroller for receiving the gas detection datum of the at least one gas detection module through a wireless communication transmission, and intelligently comparing the gas detection datum under a surveillance status, so as to issue a driving instruction for controlling an enablement of the gas guider and adjusting a guiding air-flow volume, wherein the microcontroller performs a two-way communication transmission to a pollution processing system through the wireless communication transmission, wherein the gas detection datum detected by the at least one gas detection module of the range hood is transmitted to the pollution processing system, and information transmitted from the pollution processing system is received by the microcontroller, so as to issue the driving instruction for controlling the enablement of the gas guider and adjusting the guiding air-flow volume, wherein the pollution processing system comprises:

at least one outdoor gas detection module and at least one indoor gas detection module, wherein the at least one outdoor gas detection module is disposed in an outdoor space to detect the air pollution source in the outdoor space and transmit an outdoor gas detection datum, and the at least one indoor gas detection module is disposed in an indoor space to detect the air pollution source in the indoor space and transmit the indoor gas detection datum;

at least one gas-exchanging processing device for controlling the introduction of an outdoor gas into the indoor space, so as to exchange and filter the air pollution source in the indoor space;

at least one indoor cleaning and filtration device enabled to filter and exchange the air pollution source in the indoor space; and an intelligent control-driving processing device, wherein after the intelligent control-driving processing device receives and compares the outdoor gas detection datum and the indoor gas detection datum, the intelligent control-driving processing device intelligently and selectively controls the introduction of the outdoor gas by at least one gas-exchange processing device, and the at least one intelligent control-driving processing device controls the enablement of at least one indoor cleaning and filtration device in real time, therefore the air pollution source in the indoor space passes through the at least one indoor cleaning and filtration device, so as to allow the air pollution source in the indoor space to be filtered and exchanged and become a fresh air.

2. The range hood for preventing air pollution according to claim 1, wherein the air pollution source is at least one selected from the group consisting of particulate matter, carbon monoxide, carbon dioxide, ozone, sulfur dioxide, nitrogen dioxide, lead, total volatile organic compounds (TVOC), formaldehyde, bacteria, fungi, virus and a combination thereof.

3. The range hood for preventing air pollution according to claim 1, wherein the gas guider has a clean air delivery rate (CADR) greater than 20 m3/h.

4. The range hood for preventing air pollution according to claim 1, further comprising an oil separator disposed in the diversion path, wherein the oil separator is placed upstream of the filtration and purification component, so that the oil contained in the air pollution source is separated first after the air pollution source is guided into the diversion path by the gas guider.

5. The range hood for preventing air pollution according to claim 1, wherein the surveillance status is activated as the gas detection datum of the air pollution source detected by the at least one gas detection module exceeds a safety detection value.

6. The range hood for preventing air pollution according to claim 5, wherein the safety detection value includes at least one selected from the group consisting of a concentration of PM2.5 which is less than 35 μg/m3, a concentration of carbon dioxide which is less than 1000 ppm, a concentration of total volatile organic compounds which is less than 0.56 ppm, a concentration of formaldehyde which is less than 0.08 ppm, a colony-forming unit of bacteria which is less than 1500 CFU/m3, a colony-forming unit of fungi which is less than 1000 CFU/m3, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, and a concentration of lead which is less than 0.15 μg/m3.

7. The range hood for preventing air pollution according to claim 1, wherein the at least one gas detection module comprises a controlling circuit board, a gas detection main part, a microprocessor and the communicator, and the gas detection main part, the microprocessor and the communicator are integrally packaged on the controlling circuit board and electrically connected to the controlling circuit board, wherein the microprocessor controls the detection of the gas detection main part, the gas detection main part detects the air pollution source and outputs a detection signal, and the microprocessor receives the detection signal for calculating, processing and outputting, so that the microprocessor of the at least one gas detection module generates the gas detection datum and provides to the communicator for external communication transmission.

8. The range hood for preventing air pollution according to claim 1, wherein the at least one gas detection module comprises a controlling circuit board, a gas detection main part, a microprocessor and the communicator, and the gas detection main part, the microprocessor and the communicator are integrally packaged on the controlling circuit board and electrically connected to the controlling circuit board, wherein the microprocessor controls the detection of the gas detection main part, the gas detection main part detects the air pollution source and outputs a detection signal, and the microprocessor receives the detection signal for calculating, processing and outputting, so that the microprocessor of the at least one gas detection module generates the gas detection datum and provides to the communicator for external communication transmission.

9. The rang hood for preventing air pollution according to claim 8, wherein the microcontroller receives the gas detection datum transmitted by the communicator through a wireless communication transmission.

10. The range hood for preventing air pollution according to claim 8, wherein the gas detection main part comprises:

a base comprising:

a first surface;

a second surface opposite to the first surface;

a laser loading region hollowed out from the first surface to the second surface;

a gas-inlet groove concavely formed from the second surface and disposed adjacent to the laser loading region, wherein the gas-inlet groove comprises a gas-inlet and two lateral walls, the gas-inlet is in communication with an environment outside the base, and a transparent window is opened on the lateral wall disposed adjacent to the laser loading region, and is in communication with the laser loading region;

a gas-guiding-component loading region concavely formed from the second surface and in communication with the gas-inlet groove, wherein a ventilation hole penetrates a bottom surface of the gas-guiding-component loading region; and a gas-outlet groove concavely formed from the first surface, spatially corresponding to the bottom surface of the gas-guiding-component loading region, and hollowed out from the first surface to the second surface in a region where the first surface is not aligned with the gas-guiding-component loading region, wherein the gas-outlet groove is in communication with the ventilation hole, and a gas-outlet is disposed in the gas-outlet groove;

a piezoelectric actuator accommodated in the gas-guiding-component loading region;

a driving circuit board covering and attached to the second surface of the base;

a laser component positioned and disposed on the driving circuit board, electrically connected to the driving circuit board, and accommodated in the laser loading region, wherein a light beam path emitted from the laser component passes through the transparent window and extends in a direction perpendicular to the gas-inlet groove, thereby forming an orthogonal direction with the gas-inlet groove;

a particulate sensor positioned and disposed on the driving circuit board, electrically connected to the driving circuit board, and disposed at an orthogonal position where the gas-inlet groove intersects the light beam path of the laser component in the orthogonal direction, so that suspended particles of the air pollution source passing through the gas-inlet groove and irradiated by a projecting light beam emitted from the laser component are detected;

the gas sensor positioned and disposed on the driving circuit board, electrically connected to the driving circuit board, and accommodated in the gas-outlet groove, so as to detect the air pollution source introduced into the gas-outlet groove; and an outer cover covering the base and comprising a side plate, wherein the side plate has an inlet opening and an outlet opening, the inlet opening is spatially corresponding to the gas-inlet of the base, and the outlet opening is spatially corresponding to the gas-outlet of the base;

wherein the outer cover covers the base, and the driving circuit board covers the second surface, thereby an inlet path is defined by the gas-inlet groove, and an outlet path is defined by the gas-outlet groove, so that the air pollution source is inhaled from the environment outside the base by the piezoelectric actuator, transported into the inlet path defined by the gas-inlet groove through the inlet opening, and passes through the particulate sensor to detect the particle concentration of the suspended particles contained in the air pollution source, and the air pollution source transported through the piezoelectric actuator is transported out of the outlet path defined by the gas-outlet groove through the ventilation hole, passes through the gas sensor for detecting, and then discharged through the outlet opening.

11. The range hood for preventing air pollution according to claim 10, wherein the particulate sensor is used for detecting the suspended particulate information.

12. The range hood for preventing air pollution according to claim 10, wherein the gas sensor comprises one selected from the group consisting of a volatile-organic-compound sensor, a formaldehyde sensor, a bacteria sensor, a virus sensor, a temperature and humidity sensor, and a combination thereof, wherein the volatile-organic-compound sensor detects the gas information of carbon dioxide or total volatile organic compounds, the formaldehyde sensor detects the gas information of formaldehyde, the bacteria sensor detects the gas information of bacteria or fungi, the virus sensor detects the gas information of virus, and the temperature and humidity sensor detects the gas information of temperature and humidity.

13. The range hood for preventing air pollution according to claim 1, wherein the microcontroller performs a two-way communication transmission to a cloud computing system through the wireless communication transmission, wherein the gas detection datum detected by the at least one gas detection module of the range hood is transmitted to the cloud computing system, and information transmitted from the cloud computing system is received by the microcontroller, so as to issue the driving instruction for controlling the enablement of the gas guider and adjusting the guiding air-flow volume.

14. The range hood for preventing air pollution according to claim 1, wherein after the intelligent control-driving processing device receives and compares the outdoor gas detection datum and the indoor gas detection datum, the intelligent control-driving processing device intelligently and selectively issues the controlling instruction for enabling the microcontroller of the range hood, whereby the microcontroller issues the driving instruction for controlling the enablement of the gas guider and adjusting the guiding air-flow volume, so that the air pollution source in the indoor space is filtered and exchanged to become another fresh air.

15. The range hood for preventing air pollution according to claim 1, wherein the intelligent control-driving processing device receives and compares the indoor gas detection data outputted by the at least three indoor gas detection modules under the calculation of artificial intelligence, so as to find the location of the air pollution source in the indoor space, and intelligently select and control to enable the at least one gas-exchanging processing device or the at least one indoor cleaning and filtration device adjacent to the air pollution source, so as to accelerate the guiding operation of the air pollution source and keep the air pollution source without diffusion.

16. The range hood for preventing air pollution according to claim 1, wherein the intelligent control-driving processing device receives and compares the indoor gas detection data outputted by the at least three indoor gas detection modules under the calculation of artificial intelligence, so as to find the location of the air pollution source in the indoor space, and intelligently select and control to enable the at least one gas-exchanging processing device or the at least one indoor cleaning and filtration device adjacent to the air pollution source preferentially to inhale the air pollution source, wherein the intelligent control-driving processing device selects and controls to enable the rest of the at least one indoor cleaning and filtration devices to exhaust under the calculation of artificial intelligence, so as to generate an airflow to guide the air pollution source toward the at least one indoor cleaning and filtration device adjacent to the air pollution source to be inhaled for filtering rapidly.

17. The range hood for preventing air pollution according to claim 1, wherein the filtration and purification component is one selected from the group consisting of an activated carbon, a high efficiency particulate air (HEPA) filter screen, a zeolite screen and a combination thereof.

18. The range hood for preventing air pollution according to claim 1, wherein the filtration and purification component is coated with one selected from the group consisting of a cleansing factor containing chlorine dioxide layer, an herbal protective layer extracted from ginkgo and Japanese *Rhus chinensis*, a silver ion and a combination, wherein the cleaning factor containing chlorine dioxide layer is used for inhibiting viruses and bacteria contained in the air pollution source, the herbal protective layer extracted from ginkgo and Japanese *Rhus chinensis* forms an herbal protective anti-allergic filter to resist allergy effectively and destroy a surface protein of influenza virus passing through the filtration and purification component, and the silver ion inhibits viruses and bacteria contained in the air pollution source.

* * * * *